(12) United States Patent
Rainish et al.

(10) Patent No.: US 10,432,283 B2
(45) Date of Patent: Oct. 1, 2019

(54) DIGITAL BEAM FORMING SYSTEM AND METHOD

(71) Applicant: SATIXFY UK LIMITED, Farnborough, Hampshire (GB)

(72) Inventors: Doron Rainish, Ramat Gan (IL); Avraham Freedman, Tel Aviv (IL); Dotan Goberman, Ramat Hakovesh (IL); Yoel Gat, Ramat Raziel (IL); Leon Benvenisti, Matan (IL)

(73) Assignee: SATIXFY UK LIMITED, Farnborough, Hampshire (GB)

( * ) Notice: Subject to any disclaimer, the term of this patent is extended or adjusted under 35 U.S.C. 154(b) by 0 days.

(21) Appl. No.: 16/082,459

(22) PCT Filed: Mar. 7, 2017

(86) PCT No.: PCT/IL2017/050280
§ 371 (c)(1),
(2) Date: Sep. 5, 2018

(87) PCT Pub. No.: WO2017/153985
PCT Pub. Date: Sep. 14, 2017

(65) Prior Publication Data
US 2019/0089434 A1    Mar. 21, 2019

Related U.S. Application Data

(60) Provisional application No. 62/397,367, filed on Sep. 21, 2016, provisional application No. 62/304,351, (Continued)

(51) Int. Cl.
*H04B 7/06* (2006.01)
*H01Q 3/38* (2006.01)
(Continued)

(52) U.S. Cl.
CPC .............. *H04B 7/0617* (2013.01); *H01Q 3/38* (2013.01); *H04B 7/086* (2013.01); *H04B 17/12* (2015.01)

(58) Field of Classification Search
CPC ........ H01Q 3/2682; H01Q 3/267; H01Q 3/00; H01Q 3/30; H01Q 21/00; H01Q 3/38; (Continued)

(56) References Cited

U.S. PATENT DOCUMENTS 5,928,152 A    7/1999  Wright et al.
6,029,116 A    2/2000  Wright et al.
(Continued)

FOREIGN PATENT DOCUMENTS

WO    2015173793 A1    11/2015
WO    2017/017667 A1    2/2017

*Primary Examiner* — Rahel Guarino
(74) *Attorney, Agent, or Firm* — Browdy and Neimark, P.L.L.C.

(57) ABSTRACT

A novel digital baseband beam forming system is disclosed including a plurality of digital baseband beam forming channels configured and operable for connecting via channel ports to a plurality of antenna channels associated with respective antenna elements for at least one of transmitting and receiving through the plurality of antenna elements one or more waveform signals encoding data streams. The digital baseband beam forming channels are configured and operable to apply at least one of phase and time delays of selective magnitudes to baseband signals associated with data streams encoding the waveform signals transmitted and/or received by the plurality of antenna elements, thereby beamforming said waveform signals to produce, by said waveforms, one or more data encoded beams associated with respective directions of propagation and encoding said data streams respectively. The digital baseband beam forming system may be implemented in chip (e.g. Silicon chip) and may be configured and operable for constructing scal-
(Continued)

able array comprising a plurality of such beamforming chips connectable to a respective group of antenna elements of an antenna array for carrying out at least one of transmitting and receiving beam formed waveform signals by the respective group of antenna elements.

20 Claims, 19 Drawing Sheets

Related U.S. Application Data filed on Mar. 7, 2016, provisional application No. 62/304,350, filed on Mar. 7, 2016.

(51) Int. Cl.
*H04B 7/08* (2006.01)
*H04B 17/12* (2015.01)

(58) Field of Classification Search
CPC ........ H04B 7/0617; H04B 1/12; H04B 7/086; G01S 7/52095; G01S 7/5209; H04L 27/367

See application file for complete search history.

(56) References Cited

U.S. PATENT DOCUMENTS

| | | |
|---|---|---|
| 6,110,116 A | 8/2000 | Wright et al. |
| 6,172,939 B1 | 1/2001 | Cole et al. |
| 2002/0155818 A1 | 10/2002 | Boros et al. |
| 2008/0218424 A1 | 9/2008 | Blanton |
| 2009/0231197 A1* | 9/2009 | Richards .............. H01Q 3/2682 342/377 |

* cited by examiner

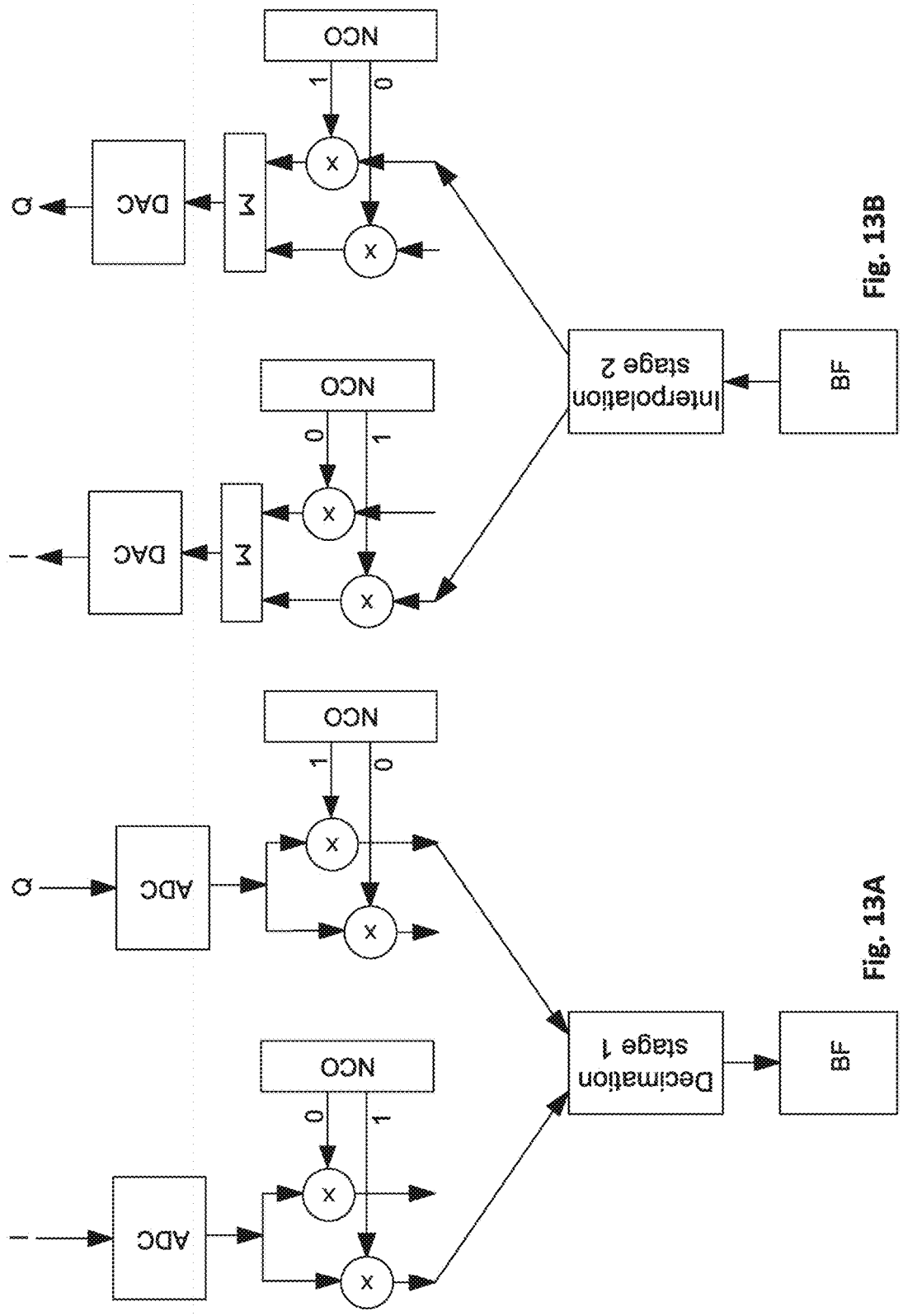

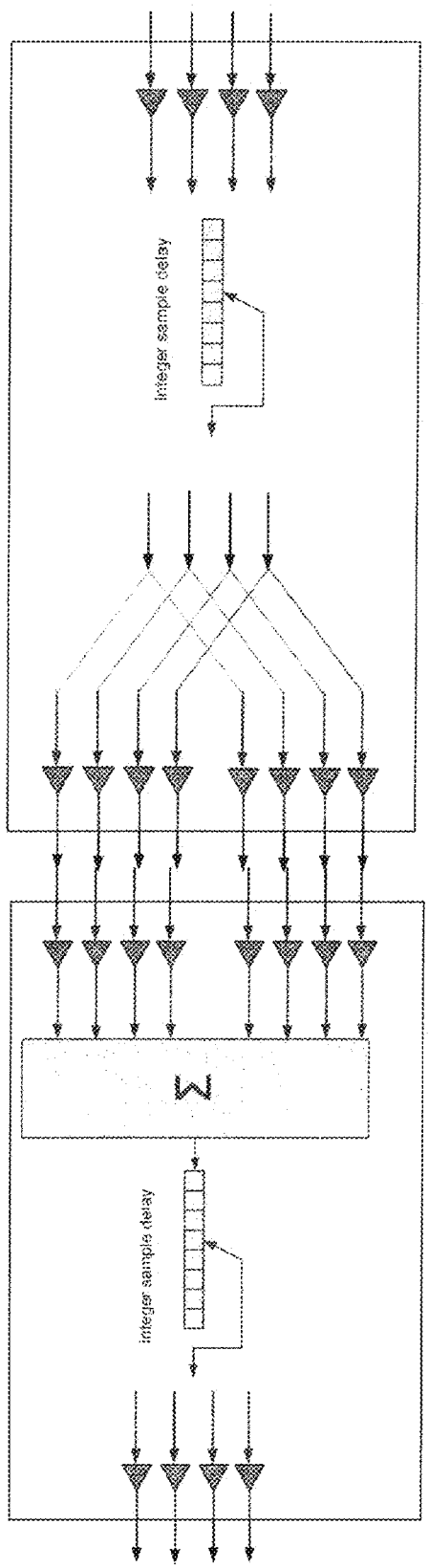

DIGITAL BEAM FORMING SYSTEM AND METHOD

TECHNOLOGICAL FIELD AND BACKGROUND

The present invention is in the field of steerable beamforming of antenna signals and more particularly to digital beamforming techniques.

Beamforming techniques are generally known, and are typically performed in antenna systems using an array of antenna elements for creating a directional antenna pattern (beam) or receiving beam from a specific direction. Such known techniques are typically aimed at providing a desired antenna pattern, i.e. desired gain and directionality of the antenna system (main lobe amplitude as compared to side lobes), etc.

Conventional antenna systems of the kind specified rely heavily on analogue signal processing, typically operated in the bandpass (RF) frequency regime (with passband centered about a carrier frequency), in order to actuate the active parts of the antenna elements with proper time and/or phase delays to produce the desired beam by the antenna array.

GENERAL DESCRIPTION

Conventional antenna systems, based on analogue signal processing, are cumbersome and costly to implement with analogue processing channels, particularly when large antenna arrays are required (with large dimensions of the antenna radiating part and/or large number of antenna elements). This might be due to the fact that RF transmission lines and analogue RF processing modules introduce various artifacts to the analogue signals propagating therethrough, and thus suffer, inter alia, from a mismatch of signal parameters between antenna elements, i.e. gain, phase, frequency parameters, which deteriorates the beam forming accuracy. This is more critical for large-scale antennas, having long transmission lines that need to be calibrated.

The present invention relates to a digital system, for example implemented as a silicon chip, for implementing a variety of new Electronically Steerable Array Antenna (ESAA) types, which is characterised by an extremely small size, low power consumption and low cost. The system may be configured to operate digitally in the base band of the signal to be transmitted/received, for introducing the proper phase and/or time delays already in the base band, while also compensating for the analogue artifacts resulted from the analogue RF front end connected between the system and the antennas. Additionally, the system provides scalable architecture for construction of large-scale antennas.

An Electronically Steered Array Antenna (ESAA) is an array of antennas in which the relative phases or delays of the respective signals feeding the antennas are set in such a way that the effective radiation pattern of the array is reinforced in a desired direction and, at the same time, it is suppressed in undesired directions. The relationships among the antennas (relative delay, phase, gain and the like) may be fixed, or may be adjustable.

A chip, or a set of chips as the case may be, construed in accordance with an embodiments of the present invention allows its integration within a ESAA, such that the design is scalable to meet the required antenna size and number of beams. The chip and ESAA may optionally further include a self-calibration circuitry.

According to a broad aspect of the present invention, there is provided a system (e.g. digital baseband beam forming chip), comprising: a plurality of digital baseband beam forming channels configured and operable for connecting via channel ports to a plurality of antenna channels associated with respective antenna elements for at least one of transmitting and receiving through the plurality of antenna elements one or more waveform signals encoding data streams; wherein said digital baseband beam forming channels are configured and operable to apply at least one of phase and time delays of selective magnitudes to baseband signals associated with data streams encoding the waveform signals transmitted and/or received by the plurality of antenna elements, thereby beamforming said waveform signals to produce, by said waveforms, one or more data encoded beams associated with respective directions of propagation and encoding said data streams respectively.

The digital baseband beam forming channels may be configured and operable to apply selective true time delays to the baseband signals that are communicated therethrough to thereby beamform said waveform signals. For example, each data stream is encoded in the baseband signal in the form of a stream of symbols communicated serially at a sampling rate through one or more of said digital baseband beam forming channels. According to some embodiments, each digital baseband beam forming channel of said one or more digital baseband beam forming channels comprises a true time delay module adapted to selectively apply a selected true time delay to the stream of symbols communicated through the digital baseband beam forming channel to thereby apply said beamforming. According to some embodiments, the true time delay module is configured and operable to facilitate selected time delays with time resolution lower than the sampling time of said digital baseband beam forming channel thereby enabling to apply said beamforming with delay resolution better than said sampling time thereby enabling beamforming with improved directional accuracy.

For example, the true time delay module comprises an adjustable time delay re-sampler module. This module is configured and operable to carry out the following: receive a digitized signal representing said stream of symbols, obtain control instructions indicative of a time delay fraction by which to delay said digitized signal whereby said time delay fraction includes a component of time smaller than a sampling time associated with said sampling rate of the digital baseband beam forming channel; resample said digitized signal via interpolation to obtain a time shifted resampled signal having the similar number of symbols as the digitized signal; and output said resampled signal thereby introducing of time delay with said time resolution higher than the sampling rate.

The true time delay module may be configured and operable for delaying the baseband signal propagation in said digital baseband beam forming channel with a time delay of resolution higher than the sampling rate of said digital baseband beam forming channel. Such true time delay module comprises: a shift register operable for delaying said baseband signal by an integer part of said time delay that measures to an integer multiplication of a sampling time of the digital baseband beam forming propagation; and an adjustable time delay re-sampler module configured and operable for delaying said baseband signal by a time delay fraction includes a component of the time delay that smaller than a sampling time of the sampling time of the digital baseband beam forming channel.

In some embodiments, the true time delay module comprises a complex gain module configured and operable for multiplying said symbols by a complex gain selected to adjust said time delay to compensate for effects associated in up/down conversion between said baseband signal and a passband signal.

The digital beam forming chip wherein said digital baseband beam forming channels comprise beam forming channels operable in at least one or more of the following: transmission mode; reception mode; and both transmission and reception modes.

Thus the TTD circuitry includes a shift register for delay which is an integer multiple of the sampling time and a circuitry for delays smaller than the sampling time. Delays smaller than the sampling time are calculated by performing an inter-sample interpolation, for example by utilizing a Farrow structure filter. The system also comprises digital compensation elements (e.g. digital compensation processing channels) which are configured to carry out at least one function from among the following: gain adjustment, phase adjustment, delay adjustment, I/Q mismatch correction, equalization and digital pre-distortion.

In some embodiments, the system includes digital compensation channels. Each digital compensation channel is connectable in between at least one of the digital baseband beam forming channels and at least one of the channel ports of the chip, and is configured and operable to apply digital compensation to the signals of said at least one channel port for compensating over analogue artifacts associated with antenna channel(s) of an analogue RF frontend module connecting said at least one channel port to one or more of the antenna elements. For example, each digital compensation channel is respectively selectively connectable in between selected one or more of the digital baseband beam forming channels and at least one channel port of the chip. In this case, the chip comprises an antenna channel combining/distributing module configured and operable for receiving beamforming configuration instructions indicative of said selected one or more of the digital baseband beam forming channels and at least one channel port and selectively connecting said selected one or more of the digital baseband beam forming channels to said at least one channel port via said digital compensation processing channel.

In case where one or more of said digital baseband beam forming channels is/are operable in at least transmission mode to enable transmission of one or more of waveform signals corresponding to said baseband signals, the at least some of said digital compensation channels may be operable in the transmission mode and comprise respective non-linear pre-distortion modules. Each non-linear pre-distortion module may be configured and operable for adjusting amplitudes and phases of respective symbols communicated therethrough so as to compensate for a non-linear distortion applied to the symbol by an amplifier of the antenna channel coupled to the respective channel port. The non-linear pre-distortion module may be associated with a non-linear distortion reference data indicative of nonlinear amplification distortion of the associated antenna channel.

Each digital compensation processing channel may also comprise a respective equalization module configured and operable for adjusting respective phases and gains of different frequency components of the baseband signal communicated in between the at least one digital baseband beam forming channel(s) and the at least one channel port associated with the digital compensation processing channel in accordance with respective frequency response indicative of phase shifts and gain variations applied to passband frequency components corresponding to said different frequency components by an antenna channel coupled to the channel port. It should be noted that the baseband signal may encode a data stream of symbols. In this case, the frequency components in the baseband signal are associated with a plurality (sequence) of symbols of said data stream. In turn, the equalization module is associated with gain variations and phase shift reference data indicative of said gain variations and phase shifts corresponding to said different frequency components that are introduced by the associated antenna channel.

In some embodiments, the digital baseband beam forming channels are configured and operable for processing said baseband signal in and in-phase and quadrature (I/Q) representation, and each digital compensation processing channel comprises an I/Q correction module configured and operable for compensating over at least one of gain and skew errors in said I/Q representation of the baseband signals communicated in between the at least one digital baseband beam forming channel and the at least one channel port associated with the digital compensation processing channel to thereby compensate over DC offset values in the I and Q channels.

In this regard, it should be noted that in some cases the system/chip is configured such that signals are communicated between the digital baseband beam forming channels and associated channel ports are in the form of in-phase and quadrature (I/Q) representation of said baseband signals.

In some cases, the system/chip is configured such that signals are, in said channel ports, in the form of intermediate (IF) frequency signals (e.g. passband (PBF) signals). Each digital baseband beam forming channel includes a frequency converter (Up and/or Down converter) for converting between the baseband signal of the digital baseband beam forming channel and said intermediate or passband frequency signals of the associated antenna channel.

The system may comprise a plurality of antenna/channel ports for connecting said digital baseband beamforming channels of the digital beam forming chip to a plurality of antenna channels associated with respective antenna elements. For example, the plurality of antenna ports are adapted for communicating at least one of: I/Q, IF signals with said antenna channels. It should be noted that the antenna ports may be analogue ports and the digital beam forming chip may include a plurality of signal converters between digital and analogue associated respectively with said antenna ports for converting between analogue signals at said antenna ports and digital signals of said digital baseband beamforming channels.

The system may be configured and operable for selectively producing, by said waveforms, a selected number of said one or more data encoded beams of at least one of selectable bandwidths and data-rates and selectable beamwidths. To this end, the digital beam forming chip may include a pool of said plurality of digital baseband beamforming channels, and an antenna channel combining/distributing circuitry configured and operable for selectively connecting baseband beamforming channels of said pool to said plurality of antenna ports according to control parameters indicative of said selected number of beams, and desired bandwidth and beam width of each beam.

The system may also include a data control input port configured and operable for receiving a control parameters indicative of one or more of the following parameters of said beams: said selected number of beams; selected antenna ports to be commonly or exclusively allocated to each of said selected number of beams; said sampling rate allocated for each of the said selected number of beams. The antenna channel combining/distributing module (circuitry/network) is connectable to said control input port for receiving said control parameters therefrom. The control input port may be configured and operable for receiving a directional control parameters indicative of selected directions of said beams. The digital baseband beamforming channels of said pool are connectable to said control input port for receiving said directional control parameters and are configured and operable for introducing time delays to the baseband signals processed thereby in accordance with said directional control parameters so as to produce said beams in the selected directions.

The control input port may be configured and operable for receiving a signal calibration parameters indicative of at least one of the following signal corrections for implementing accurate beamforming by the signals communicated via said channel ports: (i) a non-linear pre-distortion correction associated with non-linear pre-distortion of an antenna channel connected to said operative one of said digital baseband beamforming channels; (ii) frequency equalizing calibration associated with frequency response of an antenna channel connected to said operative one of said digital baseband beamforming channels; (iii) I/Q correction factors; and (iv) at least one or more of Gain, phase and time delay correction required for said beamforming. The chip may comprise the digital compensation processing channels configured and operable for processing baseband signals associated with signals communicated via said channel ports for introducing signal corrections to the baseband signals processed thereby in accordance with said signal calibration parameters.

The system of the invention may be configured and operable for selectively encoding one or more data streams in a selected number of said one or more data encoded beams respectively. To this end, the beam forming chip comprises: a pool of said plurality of digital baseband beamforming channels; a data bus port for providing said one or more data streams associated with said selected numbers of the beams respectively; and a data combining/distributing circuitry connectable to said data bus and said beamforming channels and configured and operable to selectively communicating each data-stream of said one or more data stream in between the data bus and the respective digital baseband beamforming channels associated with production of the respective beam encoding said data-stream.

The data control input port may be configured and operable for receiving data-stream control parameters associating data-streams of said bus with said beams. The data combining/distributing circuitry is connectable to said data control input port and carrying out said communicating of the data-streams according to said data-stream control parameters.

The system/chip may be configured and operable configured to allocate a variable number of said digital baseband beamforming channels to transmit and receive one or more of said beams.

The system/chip may be configured to allocate a variable number of digital baseband beamforming channels to different beams The system/chip may be configured to associate a variable number of digital baseband beamforming channels with selected antenna ports to thereby enable operating an antenna array connected to said antenna ports in an independent sub-arrays mode.

The antenna array connectable to said antenna ports may comprise antenna elements of various polarizations associated different respective ones of said antenna ports and wherein said beamforming chip is configured to associate a variable number of digital baseband beamforming channels with selected antenna ports to thereby enable control over vertical polarization, horizontal polarization, or any slant angle polarization of said beams. The chip may be configured for supporting right hand circular polarization, left hand circular polarization or any required elliptical polarization.

The beamforming chip of the invention may be configured and operable for communicating, in said antenna ports, signals of intermediate frequency ranging from zero (baseband signaling) to half the sampling rates of said beamforming channels.

The beamforming chip may comprise a predetermined number of antenna ports for connecting to up to said predetermined number of antenna elements in an antenna array; and wherein said beamforming chip is configured and operable for connecting in a chain to additional one or more beamforming chips thereby providing scalability for controlling an operation of antenna array with number of antenna elements larger than said predetermined number of antenna ports.

For example, the beamforming chip is configured and operable for implementing said chain connection via the data bus of said chip. The data bus of said chip may be associated with a serializer/deserializer module connectable to a general bus of an antenna system via serializer/deserializer repeater module enabling said daisy chain connection.

The beamforming chip may comprise a beamforming logic processor module comprising a central processing unit (CPU) and a storage section. Alternatively or additionally, a beamforming logic processor module is connectable to a control input port of the chip and configured and operable for carrying out one or more of the following: processing beamforming control instructions provided via said control input port data indicative of one or more beams to be produced by the system and operate the beam former channels of the chip to introduce corresponding delays to the baseband signals processed thereby for forming said beams; processing at configuration instructions provided via said control input port data indicative of predetermined allocation of said beam formers to said channel ports for enabling production of predetermined number of beams of predetermined bandwidth or beam width, and allocations of said data-streams to said predetermined number of beams and operating antenna channel combining/distributing module of said chip to allocation of said beam formers to said channel ports, and operating a data channel combining/distributing module of said chip to direct said data-streams, which are allocated to said beams, to/from respective beamformer channels associated with the production of said beams respectively; processing analogue channel calibration parameters associated with artifacts of analogue channels of an RF frontend module connectable to said chip via said channel ports to determine correction parameters to be applied to signals of said channel ports and operating a plurality of digital compensation processing channels of said chip based on said correction parameters for digitally compensating for said artifacts of the analogue channels of the RF frontend module.

The beamforming logic processor module may be configured and operable for performing one or more of the following: Implementing beam forming/steering in the digital domain by using true time delay; Direction of Arrival estimation; tracking of known signals.

The beamforming chip of the invention may be configured and operable as a digital baseband beamforming chip for use in an array including a plurality of similar digital baseband beamforming chips. Each such chip is connectable to a respective group of antenna elements of an antenna array via an RF front end module for at least one of transmitting and receiving beam formed waveform signals by the respective group of antenna elements. The beamforming chip may be adapted to be connected in a chain to one or more beamforming chips of the plurality of similar beamforming chips via a common bus through which data streams encoded in said beam formed waveform signals are communicated to/from the beamforming chip beam.

For example, the array of the similar digital baseband beamforming chips is an array of chipsets, each comprising one of the digital baseband beamforming chips and one or more analogue RF frontend chips connectable in between the digital baseband beamforming chip and its respective group of antenna elements.

The beamforming chip may comprise a global time delay module configured and operable for introducing time delays to the plurality of data streams communicated in between the beamforming chip and the bus so as to enable to timely synchronize the respective operations of the plurality of similar digital baseband beamforming chips thereby facilitating implementation of collective beamforming of waveforms that are collectively transmitted/received by the plurality of groups of antenna elements that are respectively connected to the plurality of similar digital baseband beamforming chips.

The invention, in its another aspect, provides a scalable array comprising a plurality of the above-described beamforming chips. The scalable array may include a plurality of similar digital baseband beamforming chips each connectable to a respective group of antenna elements of an antenna array via an RF frontend module for at least one of transmitting and receiving beam formed waveform signals by the respective group of antenna elements. The scalable array may be an antenna array comprising a tiling of a plurality of subarrays each including the above-described digital baseband beamforming chip and a respective group of antenna elements constituting a sub-antenna array connected to the sub-antenna array via an RF frontend module.

The scalable array may include a global control unit connectable to the plurality of digital baseband beamforming chips via control input ports thereof and configured and operable for operation of said plurality of digital baseband beamforming chips in synchronization, for collectively receiving and/or transmitting one or more beam formed waveform signals by the antenna array connected thereto. For example, the global control unit may be adapted to operate said array in a plurality of digital baseband beamforming chips in multi-beam configuration comprising at least one beam; or may be adapted to operate said array in a plurality of digital baseband beamforming chips for generation a plurality of beams. The plurality of beams may be used to increase a total capacity of a communication system using the array antenna, and/or the plurality of beams may be used in a payload illuminating non-bordering beams, in order to avoid inter-beam interference.

As indicated above, the present invention can advantageously be used in antenna systems including a relatively large (very large) antenna array, and can be scaled per the user needs. This makes it possible to construct a full adaptive and steerable antenna system at a very low cost, weight and power consumption. This fact makes the system provided by the present invention a viable solution in a variety of applications. Following are some of the possible applications for which the system of the invention can be implemented:

(i) Internet of Things ("IoT")

The evolution of the Internet and the pervasive availability of communications means makes this possible to integrate various types of devices ("everything"), namely sensors, appliances, meters, security cameras and others, into a single network. This is true mainly in urban and densely populated areas where coverage of cellular systems and wireless local access networks (WLAN, Wi-Fi) is ubiquitous. In rural areas, satellites can provide the missing coverage and connect sensors and other entities to the Internet. This is applicable to areas such as agriculture, water metering, weather sensors, petrol and gas metering and the like.

The PAA described above, being of low cost and of low power consumption can be used as an antenna for IoT terminals that would make it possible for them to find, acquire and track the designated satellite automatically. This in turn provides the terminal with self-installation and tracking capabilities, which highly reduces installation costs. It also enables operating mobile applications.

It should also be noted that the use of a small antenna size in these cases is possible due to the use of appropriate waveforms, as described in WO 2017/017667 assigned to the assignee of the present application and incorporated herein by reference. Low power consumption for such terminals is supported by waveforms (by using a method as described in WO 2015173793 that is assigned to the assignee of the present application and incorporated herein by reference), which can be combined with extremely low SNR waveforms in order to utilize the low duty cycle in which those terminals are expected to operate.

(ii) Payload for Small Airborne Platforms

Small airborne platforms, such as satellites and/or drones and/or nanosatellites, carrying communication payloads with phase array antenna (PAA). For example, a set of such airborne platforms may include Low Earth Orbit (LEO) satellites, High Altitude Long Endurance (HALE) solar aircraft, Unmanned Airborne Vehicle (UAV) and drones. Additionally very small satellites (i.e. "nano-satellites"), which are typically launched to heights between 100 and 1000 km, may also be considered as suitable candidates for this application. In this regards, the invention provides for constructing a full communication satellites, e.g. TV satellite, e.g. having 40×10×10 cm dimensions. Each of these platforms may be configured to carry a communication payload/system configured according to the present invention for serving a large area on the ground.

The antenna arrays system of the present invention (e.g. the PAA of the communication payload) can be scaled as described above and below according to the required constraints of the platforms in terms of link budget, array physical size, weight and power consumption. To this end the beamforming system and/or antenna array system of the present invention may be provide one or more of the following capabilities:

1. Multi-Beam
    A single PAA may illuminate multiple simultaneous beams to increase total throughput;
    A comprehensive solution combining beamformer, RF and antenna;
2. Beam Hopping
    Utilizing the payload power amplifiers as much as possible by illuminating the required beam according to the traffic pattern;
    Using the available frequency spectrum by avoiding simultaneous illumination of neighboring areas, thereby avoiding inter-beam interference and allowing re-use of the same frequency resources for adjacent cell;
3. Low power—The large scale of integration, reduces inherently the power consumption of the antenna array system. Typically, these systems operate at a low duty cycle mode, so when using the appropriate air interface waveform and a modem that supports it, power may be switched off at times where the PAA is not active.
4. Low weight—due to the reduced size (enabled by integration), the total weight of the whole system may be considerably reduced (up to 3 kg for a 256 elements array in Ku band).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 13A and 13B are schematic illustrations exemplifying configurations of the A/D and Down converters in receive mode and the configurations of the D/A and Up converters in transmit mode, respectively;

FIGS. 14A to 16 are schematic illustration of the configuration of the beam forming chip of the present invention as building blocks of an antenna array.

DETAILED DESCRIPTION OF EMBODIMENTS

Figure 1A:
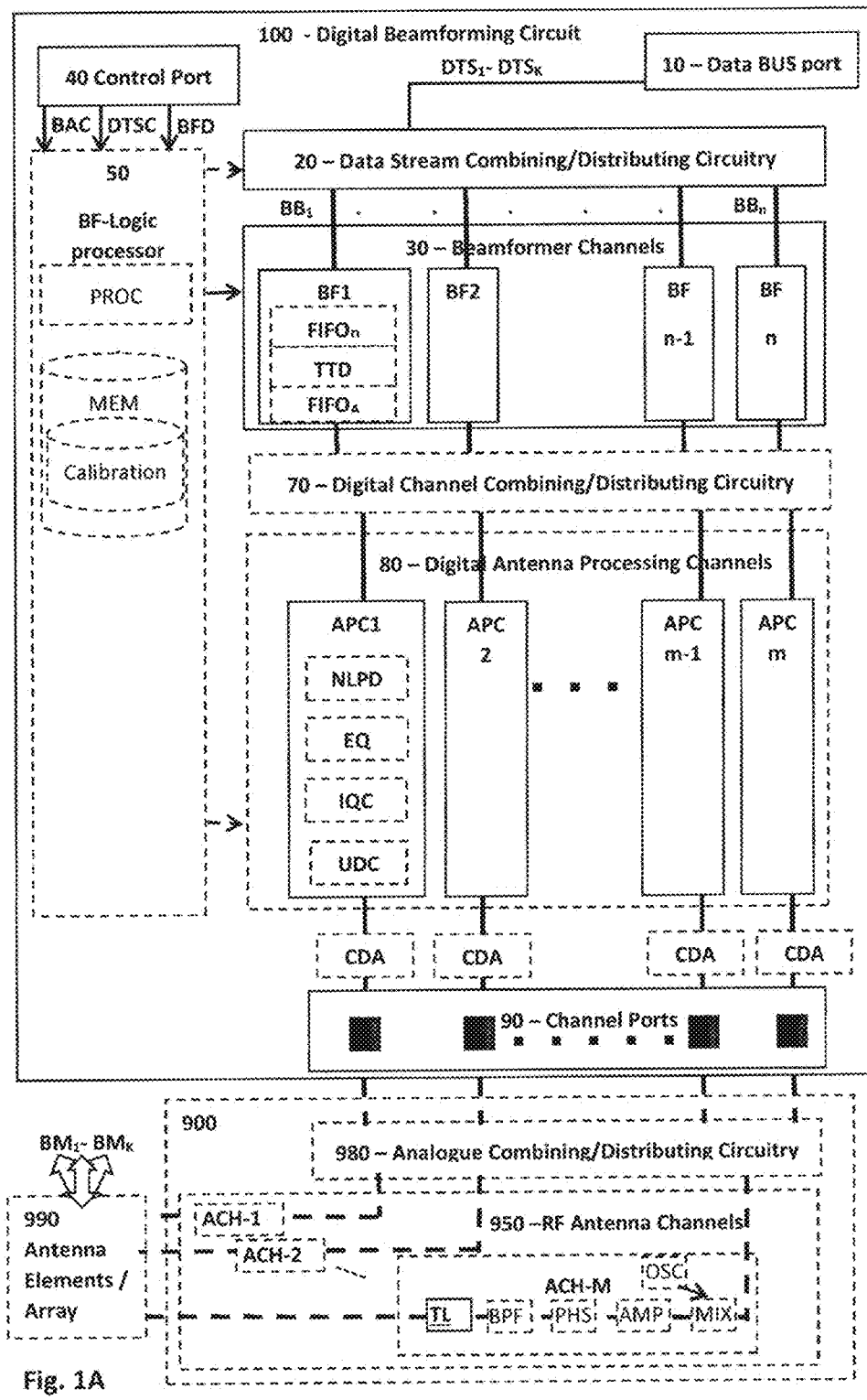
FIG. 1A is a block diagram exemplifying the configuration of a baseband digital beamforming system (chip/circuit) 100 according to an embodiments of the present invention.

Reference is made to FIG. 1 which is a block diagram exemplifying a digital beamforming system 100 according to an embodiment of the present invention. In various implementations the system 100 is implemented as in a chip, such as an ASIC chip, typically silicon based chip, including a set (plurality) 30 of digital baseband beam forming channels, BF1 to BFn, (hereinafter referred to for clarity as beam forming channels) configured and operable for connecting to a plurality of input/output channel ports 90 of the system 100, for connecting the chip/system 100 to a plurality of antenna elements 990 for at least one of transmitting and receiving through the plurality of antenna elements 990 one or more waveform signals encoding data streams.

It should be noted here that the phrases: encoding and/or encoded waveforms/signals pertain to waveforms/signals which are modulated to define the symbols (e.g. bits/words) of the data stream on the waveforms/signals. To this end the symbols may be represented by various types of modulations (e.g. amplitude/frequency and/or phase modulations) of the waveforms/signals as generally known to the art. Optionally, but not necessarily, the encoding may include error correction (e.g. checksum) symbols and or other symbols (e.g. except to the data payload of the data stream).

The system 100 is configured and operable for selectively producing, by waveforms that are transmitted or received via the antenna elements 990, a selected number of one or more data encoded beams having respectively at least one of preselected bandwidths and data-rate and/or preselected selectable beam-widths. As will be understood from the description below, in various implementations, the system 100 is configurable for producing the different beams by utilizing preselected sets (e.g. subarrays) of the antenna elements whereby each set is exclusively or commonly allocated for the generation of one or more of the beams. This end the beams can be received or transmitted by utilizing one or more common antenna elements (used for transmitting/receiving one or plurality of beams) or by utilizing exclusive antenna elements (sub-arrays of the antenna) for any one or more of the beams.

As will be readily appreciated by those versed in the art, the individual beams can be steered to desired directions by introducing appropriate time/phase delays/gain to the individual antenna signals transmitted/received for each beam by the respective antenna elements 990 participating in the transmission/reception of the beams, such that time/phase delays are selected to cause constructive interferences of the propagating waveforms to/from the antenna elements in the desired direction, with gains applied for shaping the beams.

In the present invention, the beamforming channels BF1 to BFn are adapted for applying digital signal processing to respective baseband signals (which received/to-be transmitted) so as to cause in effect a suitable corresponding time delay to the pass-band signal provided by the antennas for steering the respective beams produced by the plurality of beam forming channels in desired propagation directions. Particularly, in various implementations the beamforming channels BF1 to BFn include respective True-Time-Delay modules TTD that are configured and operable for introducing true-time-delays to the respective baseband signals processed by the corresponding beamforming channels BF1 to BFn.

More specifically, although operation in the baseband, the digital TTD circuit TTD used in the system 100 of the present invention is configured and operable for introducing the appropriate time delay to the baseband signal and also introducing to the baseband signal and appropriate carrier phase correction to delay the phase of the carrier upon the up/down conversion between the baseband and the passband signals (e.g. by the up/down convertor module UDC.

For example a passband signal s(t) (also interchangeably referred to herein as bandpass signal) which is a signal centered about a nonzero carrier frequency $f_c$ can in effect be represented/approximated by:

$$s(t)=A(t)\exp(j2\pi f_c t+\phi(t))=A(t)\exp(j\phi(t))\exp(j2\pi f_c t)=C(t)\exp(j2\pi f_c t) \quad \text{Eq. 1}$$

where C(t) is the baseband signal (which is the complex envelope encoding data on the carrier frequency $f_c$) that is defined by the (slowly varying) amplitude and phase functions of time: A(t), $\phi(t)$. The baseband signal C(t) is a signal with spectral content ranging within a baseband bandwidth centered about zero frequency.

Figure 1B:
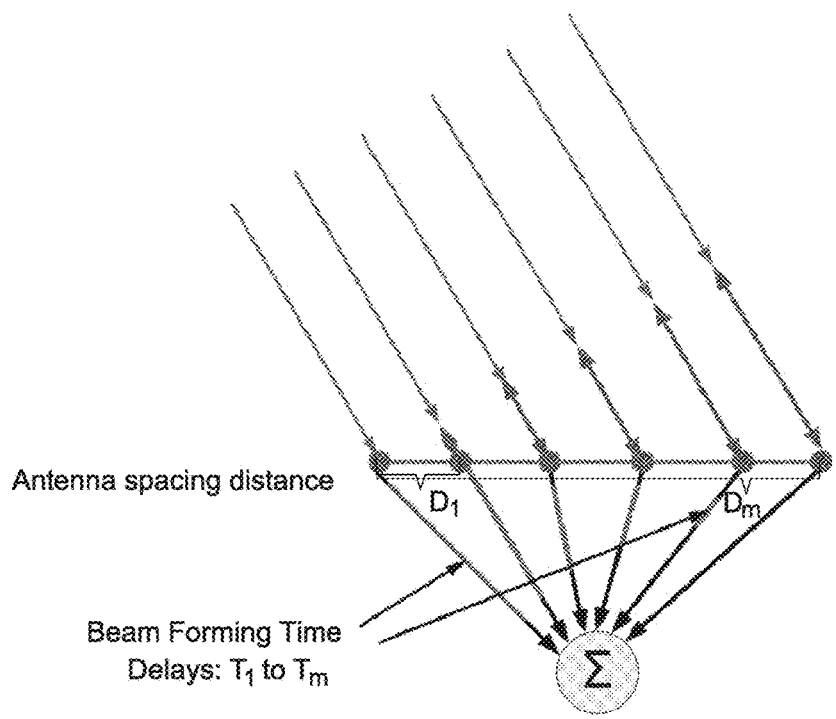
FIG. 1B is a schematic illustration exemplifying beamforming principles.

FIG. 1B is a schematic illustration of beamforming carried out in the direction α relative to the antenna boresight direction. Generally, a beam forming operation in a predetermined direction α requires that passband signals s(t) transmitted/received to/by each antenna element i would be delayed by a time delay $T_i=(d_i/c)\sin(\alpha)$ where $d_i$ is the distance of the antenna element i from a reference location in the antenna array and c is the speed of light. That each the passband signal $s_i(t)$ of the antenna channel i should be delayed as follows: $s_i(t)=s(t-\tau_i)$, so the summation of the passband signals of the antenna elements $\{s_i(t)\}$ would be coherent in the preselected direction α of the beam.

In a typical phased array, where the envelope (baseband) signal C(t) is assumed to vary slowly in time (relative to the size of the size/dimensions of antenna array used to transmit/receive the beam—namely slowly relative to the maximal time delay $MAX\{T_i\}$ between the most distant antenna elements in the array. Accordingly, in this case the delays incurred to the baseband signals are relatively small, and there may not be a need to introduce a time delay to the baseband signals since approximately:

$$C(t-\tau_i) \approx C(t-\tau_0) \text{ for all } i \quad \text{Eq. 2}$$

Therefore in such typical phase arrays the delay operation is replaced by a phase shift applied to the carrier signal of the frequency $f_c$. Accordingly, in this case upon summation of the passband signals (which during transmission occurs during propagation of the waveforms and in reception occurs in the signal processor) the carrier phases of the passband signals $s_i(t)$ are coherently aligned and summed, but the envelopes, the baseband signal $C_i(t)$ parts of the passband signals $s_i(t)$ are not summed exactly coherently and therefore the summed envelope is spread.

Indeed, this may have negligible effect on the beamforming in cases where the baseband signal is slowly varying relative to the dimensions of the antenna array (namely in cases when the approximation of Eq. 2 is valid).

However, for some applications, such as satellite data transmissions, in which high data rates as well as accurate beam forming are required, the bandwidths of the baseband signal is required to be wide enough to accommodate the high data rates (so that the baseband signal C(t) can no longer be considered as slowly varying, and/or the dimensions of the antenna array are required to be large enough to facilitate the required beamforming accuracy. In such cases the approximation of Eq. 2 may no longer be valid and appropriate time delay correction should be introduced to both the baseband signal and to the phase of the carrier wave $f_c$.

According to the present invention both these corrections to the time delay of the baseband signal as well as the phase delay of the carrier are introduced digitally by the system 100, by each of the beamforming channels BF1-BFn which are configured and operable to apply appropriate digital signal manipulation on the respective baseband signals $\{C_i(t)\}$ processed thereby so as to introduce thereto the required baseband time delays $\{T_i\}$ as well as the respective required carrier phase shifts $\{2\pi f_c T_i\}$. This enables to utilize the system 100 for implementing large beam-forming antenna arrays capable of accurate beam steering reproduction.

Moreover, as described in more details below with reference to FIG. 1C, in certain embodiments of the present invention the beamforming channels BF1 to BFn include novel respective TTD modules that are configured and operable for introducing time delays with higher resolution than the sampling rate. In other words the TTD circuits TTD of the beamforming channels BF1 to BFn are capable of introducing baseband time delays $T_i$ that are smaller than the sampling time of the beamforming channels BF1 to BFn and/or time delays $T_i$ that contain time fractions that are smaller than the sampling time. This is achieved for example by utilizing a resampler to perform a time delayed inter-sample interpolation of the samples (symbols) of the baseband signal communicated/processed by the respective beamforming channel (any one or more of BF1 to BFn).

Additionally, the TTD circuits TTD of the beamforming channels BF1 to BFn include a complex gain module which is configured and operable for multiplying/mixing the baseband signal by complex phase-shifts that measure to the required carrier phase shifts $\{2\pi f_c T_i\}$ of the carrier wave per each beamforming channel. This provides for correcting the carrier phases already in the digital baseband processing stage (e.g. instead of utilizing analogue mixers to do so in the analogue antenna channels—which is much more costly and complex).

Turning back to FIG. 1A, the system 100 (e.g. digital baseband beam forming chip) of the invention includes a pool 30 of plurality of digital baseband beamforming channels, a data bus port 10 configured and operable for providing one or more data streams $DTS_1$-$DTS_K$ associated with the respective one or more beams $BM_1$-$BM_k$ formed by the system 100 (wherein in beam reception operation the data-stream is decoded by the system from the associated beam and fed into the data BUS 10, and in transmission mode the data stream of the beam is received by the data BUS 10 and further encoded on the respective beam via the system 100. The system 100 also includes a data combining/distributing circuitry 20 which is connected in between the data BUS 10 and the plurality of digital baseband beamforming channels of the pool 30. The data combining/distributing circuitry 20 is configured and operable to selectively communicating each data-stream of one or more data stream channeled thereby in between the data bus 10 and the respective digital baseband beamforming channels BF1 to BFn associated with production of the respective beam encoding the data-stream. It should be understood that there is generally a one to one correspondence between the beams $BM_1$-$BM_k$ and the datastreams DTS1-$DTS_K$. Each beam $BM_j$ encodes one data stream $DTS_j$. The data BUS 10 communicated the each of data-stream as input/output of the system 100 (in data stream transmit and receive modes respectively) and the data combining/distributing circuitry 20 is configured and operable to combine/distribute each of the data streams in between the data BUS 10 and the respective beamforming channels that are responsible for forming the respective beam which encode the respective data-stream.

Indeed, each beam is generally formed by a plurality of beam former channels BF1 to BFn associated with a plurality of antennas (it should be understood here and explained below that the chip 100 may be chained in a cascade/daisy-chain with additional chips 100 so that a data stream $DTS_j$ may generally be associate with no beam-forming channels in the specific chip of the cascade or with single beam forming channel of with a plurality of the beam forming channels.

Accordingly, the system/chip 100 includes a control data port 40 configured and operable for receiving data-stream related control parameters DTSC that are indicative interalia of an association between each data stream (e.g. $DTS_j$) of the bus and the corresponding beam-forming channels (e.g. $BF_1$, $BF_3$, $BF_5$) which are used for beamforming the corresponding beam (e.g. $BM_j$) associated with the respective data stream (e.g. $DTS_j$). In turn, the data combining/distributing circuitry 20 is connectable to control data port 40 (e.g. connected directly and/or via optional beam forming logic processing utility 50 which may also be a part of the system/chip 100) and is configured and operable for utilizing the data-stream related control parameters DTSC for carrying out time synchronized communication of the data-streams in between the data BUS 10 and the beam-forming channels, typically plurality of them (e.g. $BF_1$, $BF_3$, $BF_5$) according to the data-stream control parameters DTSC indicating which beam-forming channels are associated with which beam/data-stream $BM_j$/$DTS_j$.

To this end, when transmitting a data stream $DTS_j$ the data BUS 10 provides the data stream $DTS_j$ in the form of a stream of symbols (which may be one bit or multibit symbols) to the combining/distributing circuitry 20, and from there distributed/duplicated to the respective beam-forming channels (e.g. $BF_1$, $BF_3$, $BF_5$) associated with the respective data-stream/beam $DTS_j$/$BM_j$. Typically the stream of symbols of the data stream(s) $DTS_j$ are serially communicated at a predetermined sampling rate of the system 100 (e.g. of the beam-forming channels $BF_1$-$BF_n$), thereby forming a digital signal representation(s) $BB_1$-$BB_n$ of the baseband (envelope) signal, which encodes data in the respective beam $DTS_j$ (i.e. where the data is encoded by modulating a carrier signal by the baseband signal). Accordingly optionally when transmitting a data stream $DTS_j$ the combining/distributing circuitry 20 may be adapted to simultaneously write the symbols of the data stream into a memory buffer (e.g. first in first out buffer) $FIFO_D$ of the respective beam-forming channels associated with the data stream $DTS_j$ and in turn the respective beam-forming channels (e.g. $BF_1$, $BF_3$, $BF_5$) synchronously read the buffer $FIFO_D$ at the predetermined sampling rate of the system 100 thereby generating the digital baseband signal BBj which is processed thereby (e.g. time delayed thereby in accordance with the required time delays $T_i$ required for forming the beam).

In receive operation, the beam-forming channels (e.g. $BF_1$, $BF_3$, $BF_5$), which are associated with the data stream $DTS_j$ according to the control parameters DTSC, synchronously process the baseband signals received thereby to introduce the appropriate time delays to the baseband signals for beamforming the signals received by the antennas. The appropriately delayed symbols of the baseband signal of each of the participating beam forming channels may then be registered/written in synchronization the associated buffers $FIFO_D$ of beam forming channels, and in-turn read in synchronization by the data combining/distributing circuitry 20. Here in order to apply the beamforming the combining/distributing circuitry 20 is configured and operable for combining (e.g. coherently summing/adding) the symbols of beam-forming channels (e.g. $BF_1$, $BF_3$, $BF_5$) which are associated respectively with each beam $BM_j$. Accordingly, the data combining/distributing circuitry 20 may include a plurality of summation modules (not specifically shown; e.g. one per each beam that should be simultaneously produced by the system), each associated with beamforming of one received beam $BM_j$ and configured and operable for implementing time synchronized summation of the symbols of the beam-forming channels (e.g. $BF_1$, $BF_3$, $BF_5$) associated with the respective received beam $BM_j$. To this end the time synchronized summation may be implemented by real time operation of the combining/distributing circuitry 20 (of the summation modules) to rad and add the symbols registered in the FIFO buffers $FIFO_D$ of the beam-forming channels (e.g. $BF_1$, $BF_3$, $BF_5$) associated with the requested beam, and output/write the resulted sum to corresponding data stream $DTS_j$ communicated through data BUS 10.

According to some embodiments of the present invention the system 100 also includes digital channel combining/distributing circuitry 70 which is configured and operable for selectively connecting baseband beamforming channels of the pool 30 to the plurality of antenna ports 90 (typically analogue ports) for connecting the chip 100 to m antenna elements 990 (e.g. of an antenna/phased array). It should be understood that the digital channel combining/distributing circuitry 70 is optional and may alternatively or additionally be replaced by an external analogue channel combining/distributing circuitry 980 which operates to appropriately combine/split the analogue signals to/from the antennas and the plurality of antenna ports 90 of the system 100.

To this end the control data port 40 may be configured and operable for obtaining beam' allocation related control parameters BAC that are indicative inter-alia of an association between the beamforming channels 30 and the antenna channel ports 90. The digital channel combining/distributing circuitry 70 is connectable to control data port 40 (e.g. connected directly and/or via optional beam forming logic processing utility 50) and is configured and operable for directing the communication of the baseband signals between the beamforming channels 30 and the antenna ports 90 according to the allocation related control parameters BAC.

As will be appreciated from the description below, in some implementations of the system 100 the digital channel combining/distributing circuitry 70 may be configured and operable to enable one-to-one and many-to-one associations between the beamforming channels $BF_1$-$BF_n$ and the antenna ports 90 (or the antenna channels $ACH_1$-$ACH_m$). One-to-one correspondence between an antenna element and a beamforming channel is applicable for the case where the antenna element is responsible for receiving/transmitting signals associated with specific one (e.g. $BM_j$) of the beam $BM_1$-$BM_k$ with high data-rate (large bandwidth), and many-to-one correspondence is applicable for the case where an antenna element is used for receiving/transmitting signals associated with several (two or more) beams (e.g. $BM_j$ and $BM_h$) of the beam $BM_1$-$BM_k$ with reduced data-rate (smaller bandwidth than the case the antenna elements is used to transmit/receive only one beam). In this regards, it should be also understood that the greater the number of antenna elements that are used for transmitting the beam the better is the directional accuracy of the beam forming (since the beam width as well as the sidelobes of the beam are associated with the span/distance of the antenna elements used for the transmission reception and the inter-distances (spatial resolution) of the antenna elements).

Optionally the digital channel combining/distributing circuitry 70 may be configured and operable to also enable many to-many associations between the beamforming channels $BF_1$-$BF_n$ and the antenna ports 90 (or the antenna channels $ACH_1$-$ACH_m$) to thereby enable to configure the array to any number of beams, any number of antennas per beam, as long as the sum of the data rate over all antennas and over all the beams is less than the bus data rate.

Accordingly the digital channel combining/distributing circuitry 70 of the system 100 provides the flexibility of configuring the allocation of antenna elements for transmitting receiving the beams exclusively or collectively with selectable bandwidths (data-rates), beam-widths, and beam-forming accuracies, depending on the particular requirements of the transmitting/receiving system employing the chip 100 of the present invention.

In various embodiments of the present invention the beam' allocation related control parameters BAC are indicative of one or more of the following: the selected number K of beams (same number as that of the data streams), and the desired bandwidths and beam-widths of the beams transmitting each datastream. Indeed, more simply the parameters may merely pertain to the allocation of antenna channels for the beams whereby the allocation may be exclusive and/or common. Alternatively or additionally such allocation of the antenna channels may be determined/optimized by the beamforming logic processor 50 based on the above parameters (namely based on the selected number K of beams, and the desired bandwidths and beam-widths of the beams) Thus alternatively or additionally the control data port 40 may be adapted to obtain beam' allocation related control parameters BAC indicative of the selected number of beams K; selected antenna/channel ports 90 to be commonly or exclusively allocated to each of the selected number of beams; and/or the sampling rate allocated for each of the selected number of beams.

It should be understood that the digital channel combining/distributing circuitry 70 (similarly to the data combining/distributing circuitry 20) is configured and operable for carrying out time synchronized (e.g. in real time) communication of the baseband signals $BB_1$-$BB_n$ in between the beam-forming channels 30 and the antenna ports 90.

To this end, when during a transmitting operation of a data stream $DTS_j$ encoded on a beam $BM_j$, the associated beam-forming channels (e.g. $BF_1$, $BF_3$, $BF_5$) provide the respectively time delayed baseband signals (e.g. $BB_1$, $BB_3$, $BB_5$) which encode the data stream $DTS_j$ with appropriate delay corresponding to the respective antenna elements participating in the transmission of the beam $BM_j$ to the desired direction. The digital channel combining/distributing circuitry 70 is configured and operable to simultaneously communicate the baseband signals (e.g. $BB_1$, $BB_3$, $BB_5$) to the respective channel ports with no time delay difference between them so as to allow the correct interference to occur for forming the beam $BM_j$ in the desired direction. In cases where multiple beam former channels (e.g. BF1 and BF2) transmit via a common antenna/channel port 90 (many to one configuration), the digital channel combining/distributing circuitry 70 sums/adds, in real time the transmitted symbols of the multiple beam-former channels that are associated with the common antenna ports. For instance, the beam former channels 30 may be associated with antenna-side FIFO buffers $FIFO_A$ to which the symbols of the baseband signals BB1-BBn to be communicated between them and the antenna channels are respectively registered/stored synchronously in real time with the sampling rate (clock frequency) of the system 100. In the transmission operation the digital channel combining/distributing circuitry 70 reads the symbols of the baseband signals BB1-BBn from the beam formers 30 simultaneously, when needed (according to the BAC parameters) sums, in real time, the symbols that are directed to the common antenna/channel port, and simultaneously registers the summed symbols to their corresponding antenna/channel ports 90 (e.g. or to respective digital processing channels 80 possibly associated with the ports 90) at the sampling rate of the system 100. For the summation operation the digital channel combining/distributing circuitry 70 may include a plurality of RT summation modules (not specifically shown) e.g. one per each of the antenna/channel ports 90 to which summed beam former signals can be fed during transmission. In turn the antenna/channel ports 90 may synchronously read the beam former signal (summed or not and further process them in preparation for output to the analogue antenna channels ACH-1 to ACH-M via the antenna/channels ports 90 of the system 100.

In receive operation, the digital channel combining/distributing circuitry 70 simultaneously reads the symbols of the baseband signals obtained by the respective antenna ports 90 (e.g. possibly the signals are read from the digital processing channels 80 possibly associated with the ports 90) and distribute them synchronously and in real time to the respective beamformer channels 30 associated (in the BAC parameters) with reception of the baseband signals of each antenna/channel ports 90. E.g. this may be achieved for example by registering the respective signals to the FIFO buffers $FIFO_A$ of the respective beam-forming channels.

According to some embodiments of the present invention the system 100 also includes a plurality 80 of digital processing channels of $APC_1$ to $APC_m$ configured and operable for processing the signals of the antenna channels/ports 90 so as to apply various signal corrections to compensate over artifacts of the analog antenna channels ACH-1 to ACH-M connecting the chip/system 100 to the respective antenna elements, and/or to perform preprocessing such as up/down conversion, and/or D/A or A\D conversions of the signals propagation between the chip/system 100 and the antenna channels ACH-1 to ACH-M of the RF frontend 900.

Advantageously the digital implementations of the digital processing channels of $APC_1$ to $APC_m$ within the beamforming chip/system 100 provides cost effective, energetically efficient, and compact and lightweight solution for accurate production (transmission/reception) of data encoded beamformed signals/waveforms.

In some embodiments the digital processing channels 80 include n processing channels APC1 to APCn which are respectively associated with or made part of the beamforming channels BF1 to BFn themselves. However in some implementations, such as that illustrated and exemplified in the figure the digital processing channels 80 include processing channels APC1 to APCm coupled to the antenna channel ports 90 of the chip 100. This configuration may be preferable for some implementations as it may yield accurate signal correction in cost effective manner because the corrections are applied directly to the signals communicated between the system and the antenna channels and before the signals are split/combined to the different beamformer channels by the digital channel combining/distributing circuitry 70.

In other words, according to some embodiments the digital processing channels 80 are connectable between the beamforming channels 30 and the digital channel combining/distributing circuitry 70 and are therefore associated with one to one correspondence with the beamforming channels 30 and configured and operable for applying various signal processing as described in more details below to the signals baseband signals processed by the beamforming channels 30. The which are in-turn connected with a respective plurality of antenna ports 90 (typically analogue ports) for connecting to m antenna elements 990 (e.g. of an antenna/phased array).

Alternatively or additionally, as specifically illustrated in the example of FIG. 1A the digital processing channels 80 may be connected between the digital channel combining/distributing circuitry 70 and the plurality of antenna ports 90, and may generally be associated respectively (with one to one correspondence) with the antenna ports 90 for applying various signal processing as described in more details below to the signals communicated (transmitted/received) via the antenna ports. In this case there may be m digital processing channels 80, APC1 to APCm, which are in-turn connected respectively to the m antenna ports 90 thereby facilitating the processing of signals of m antenna elements 990 (e.g. of an antenna/phased array).

In this regards it should be noted that the system 100 includes a plurality of antenna/channel port 90 which are typically configured and operable for connecting to an analogue RF frontend module(s) 900 defining a plurality of analogue RF antenna channels ACH-1 to ACH-M connectable to a respective plurality of antenna elements 990. The RF frontend module(s) 900 may or may not be a part of the system 100 and typically includes a series of analogue modules implementing analogue transmission paths to/from the antenna elements 990. These may include one or more of the following per each antenna channel ACH: RF amplifier(s) AMP for amplifying the signals transmitted or received via the antenna channel; signal mixers MIX (typically associated with respective oscillators OSC) for up/down converting the transmitted received signal respectively, in between the transmission frequency of the passband of the signal and the baseband/intermediate frequencies of the signals at the antenna/channel ports 90 of the system 100 frequency and transmission lines TL to the respective antenna elements which possibly include elements such as: phase shifter PHS, frequency filters BPF impedance adjusters, switches and/or other analogue elements.

To this end, the digital processing channels 80 included in the system/chip 100 are configured and operable to apply various signal corrections to compensate over artifacts of the analog antenna channels of the RF frontend module(s) 900 while possibly additionally or alternatively enabling to obviate some of the analogue elements for providing cost effective, energetically efficient, and/or compact antenna system. The digital processing channels APC1 to APCm may each include one or more of the following:

(i) A non-linear pre-distortion module NLPD configured and operable for adjusting an amplitude of each symbol communicated through the digital antenna processing channel $APC_m$ (e.g. in the transmission direction from the digital baseband beam forming channel(s) and respective antenna/channel port) so as to compensate for a non-linear distortion applied to the symbol by an amplifier of the analogue antenna channel $ACH_m$ coupled to the channel port 90 (e.g. coupled to the digital antenna processing channel $APC_m$);

(ii) An equalization module EQ configured and operable for adjusting respective phases and gains of different frequency components of the baseband signal communicated in between the digital baseband beam forming channel(s) and a channel port 90 associated therewith, in accordance with respective frequency response indicative by an antenna channel $ACH_m$ coupled to the channel port 90 (e.g. coupled to the digital antenna processing channel $APC_m$);

(iii) In embodiments in which the system 100 processes the baseband signal(s) in the in-phase (I) and quadrature Q representation (so called I/Q representation), each of the digital processing channels APC1 to APCm may include of I/Q correction module IQC configured and operable for compensating over at least one of gain and skew errors in the I/Q representation of the baseband signal that are communicated in between the digital baseband beam forming channel(s) and a channel port associated therewith. The I/Q correction module IQC may be adapted to compensate over DC offset values in the I and Q channels;

(iv) In some embodiments the system 100 is configured such that the signals in the channel ports are provided to/from the analogue antenna channels in the form of baseband signals (e.g. with frequencies centered at zero) and/or passband—or intermediate—frequencies signals (e.g. with frequencies centered about a certain intermediate frequency $f_i$ or at the carrier frequency $f_c$). In the later cases the each of the digital processing channels APC1 to APCm may include an up/down converter UDC for converting the frequency of signals between the passband (which has the relatively high intermediate/carrier frequencies $f_i$ or $f_c$) at the channel port 90 to the lower frequency baseband signal which is processed by the system 100 of the present invention. In this regards it should be noted that in implementations where the system is designed only for transmission beamforming, the converter UDC may be configured and operable only as up-converter and vice versa, in implementations where the system is designed for only receiving beamforming the converter UDC may be configured and operable only as down-converter.

(v) In embodiments in which the system 100 is configured such that the signals in the channel ports 90 are provided to the RF frontend 900 in an analogue form, each of the digital processing channels APC1 to APCm and/or each of the channel ports may include a converter CDA capable of converting the signal between the digital form by which it is processed by the system 100 and the analogue form by which it is provided at the channel ports 90. In this regards it should be noted that in implementations where the system 100 is designed only for transmission beamforming, the converter CDA may be configured and operable only as D/A converter (from digital to analogue form) and vice versa, in implementations where the system 100 is designed for only receiving beamforming the converter CDA may be configured and operable only as A/D converter from analog to digital from. In general implementations the converter CDA may include both D/A and A/D converters and a switch for switching between them in accordance with whether transmit or receive operation in carried out through the respective channel port associated with the CDA converter.

Figure 1C:
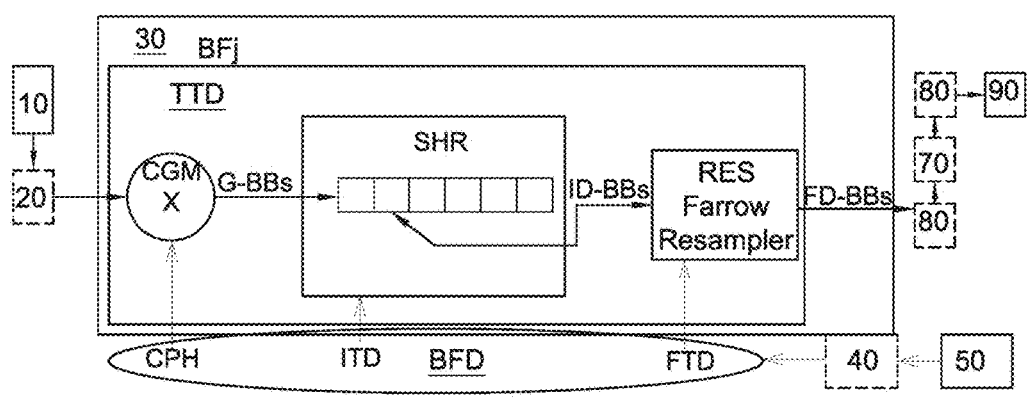
FIG. 1C is a block diagram illustrating in more details one of the beamforming channel of the beamforming system 100 which is configured and operable with a true time delay circuit according to the present invention adapted for providing delay times with resolution higher than the sampling rate of the beamforming channel.

Reference is made now to FIG. 1C which is a block diagram schematically illustrating a true time delay circuit/module TTD implemented according to an embodiment of the present invention to allow application of time delays with time resolution higher than the sampling time/rate of the beamforming channels 30. Here the TTD of a specific one of the beam forming channels, BFj, is illustrated in details. For clarity additional elements/modules of the system 100 which are discussed in more details above are also illustrated schematically in the figure with bold arrows designating the signals propagation between the elements during transmission mode and light arrows designating control parameters provided to the TTD circuit. It should be understood that for reception mode of operation the signal would be propagating in the between the modules in the direction opposite to that illustrated by the bold arrows.

As illustrated the true time delay module TTD includes an adjustable time delay re-sampler module RES. The re-sampler module RES is configured and operable for carrying out the following:

receiving a digitized baseband signal BBS representing the stream of symbols encoded in the baseband;

obtaining control instructions data FTD indicative of a time delay fraction by which to delay the received digitized baseband signal ID-BBS. The time delay fraction FTD actually includes/or is some cases constituted by a time delay component of duration shorter/smaller than the sampling rate of operation of the TTD circuit (e g smaller than the sampling time of digital baseband beam forming channel in which the TTD is implemented).

The re-sampler module RES resamples the received digitized baseband signal (e.g. via interpolation) and selects/output a set of time shifted samples FD-BB of the interpolated signal to which are shifted by the required time delay fraction FTD. It should be noted that the time shifted resampled signal FD-BB may generally have the same number of samples (e.g. at the same sampling rate) as the digitized baseband signal ID-BBS input to the re-sampler module RES. Here the purpose of the interpolation is not to produce additional samples along the channel but only to produce one or more interlaced sets of samples, which are interlaced in time in between the original samples of the original baseband signal ID-BBS, and output a time shifted resampled signal FD-BB which includes generally one of the one or more time interlaced sets of samples. Accordingly, an interpolated time shifted signal FD-BB is obtained at the output of the re-sampler which may be shifted by a fraction of the sampling time of the channel. This allows to output the resampled signal while introducing of time delay Ti with time resolution higher than the sampling rate of the channel. In this example a Farrow re-sampler RES is used for delays that are smaller than the sampling time.

According to some embodiment, the TTD module also includes an integer time delay module SHR which is configured and operable for delaying the inputted baseband signal BBs by a time delay ITD that measures to an integer number of the sampling times (being referred to herein as integer part of the time delay Ti). In the present example the integer time delay module SHR is implemented by a shift register (e.g. FIFO) capable of shifting the input samples of the baseband signal BBs by an integer number of samples thereby introducing a delay that is an integer multiplication of a sampling time.

It should be noted, that although not specifically shown the TTD module of the present invention may be configured and operable for implementing the true time delay on the signal BBs provided in the I/Q representations. Accordingly the shift register SHR may be configured and operable to accommodate both the I/Q components of the signal and in the same manner also the also the re-sampler RES may be adapted to perform the time delayed resampling on both the I/Q components.

Additionally, as indicated above the TTD module TTD of the present invention may also include a complex gain module CGM which is configured and operable for multiplying/mixing the input baseband signal BBs by a complex phase-shift CPH that measure to the phase shift required for adjusting the phase of the carrier wave in order to produce the accurate beamforming as well as a beamformer gain GBF needed to adjust the beamformer channel gain and to assist in shaping the resulting beam.

More specifically, the complex phase shift CPH is about $CPH=2\pi f_c T_i$ where $f_c$ is the frequency of the carrier wave (e.g. after converting the baseband signal to the passband) and the $T_i$ is the total time delay introduced to the baseband signal. To this end the total time delay $T_i$ is the sum of the integer and fraction time delays as follows $T_i=ITD+FTD$. Generally the complex gain module CGM may be implemented by a multiplication circuit configured and operable for multiplying the samples of the baseband signal BBs by the gain GBF and phase CPH to produce a gain corrected baseband signal G-BBs, which is then time shifted by the TTD as described above. To this end the complex gain module adjusts said time delay to compensate for effects associated in up/down conversion between said baseband signal and a passband signal.

In this non limiting example, the input to the beamforming is a stream of In-phase and Quadrature (I/Q) samples of the modulated baseband signal. The complex gain module CGM operates in the digital domain and includes of a basic multiplier to provide gain and phase correction suitable for a selected central frequency of the carrier $f_c$. Possibly the gain module CGM is further associated with an interpolation/decimation stage/module (not specifically shown in the figure) which is configured and operable to match the sampling rate in/out put of the gain module CGM to that of other modules of the TTD such as the re-sampler module RES and the shift register SHR which may be operating at a higher sampling rates.

It should be noted that the amount $T_i$ by which to delay the baseband signal BBS of each beamforming channel in order to achieve the required baseband operation is provided to the system 100 via the control port 40, while optionally further processing of the required delay to determine the required the fraction time delay FTD, integer time delay ITD, and complex phase CPH may optionally be performed by the beamforming logic processor 50 or provided directly via the control port.

It should be understood that according to the present invention the beamformer channels BFi may be configured for operating in transmission mode, reception mode, and/or for both reception and transmission. This particular configuration used in any specific implementation of the chip/system 100 may vary according to the purpose of the implementation. In this regards, the Arrows which designate the signal propagation in FIG. 1C illustrated the direction propagation of the signal in transmission mode operation of the TTD circuit. Yet it should be noted that in reception mode of operation the signal would propagate in the opposite direction than that illustrated by the arrows in the figure while the configuration of the TTD circuit module may be similar to that illustrated.

To this end, control input port 40 of the system 100 is configured and operable for receiving a indicative of the reception/transmission mode of operation of each of the beamforming channel BFi as well as directional control parameters indicative of selected directions of the beams to be produced by the beamforming channels. In turn, digital baseband beamforming channels 30 are connectable to the control input port for receiving the data indicative of the reception/transmission mode of operation and the directional control parameters and are configured and operable for introducing time delays to the baseband signals processed thereby in accordance with said directional control parameters so as to produce the transmitted/received beams in the selected directions.

Figure 1D:
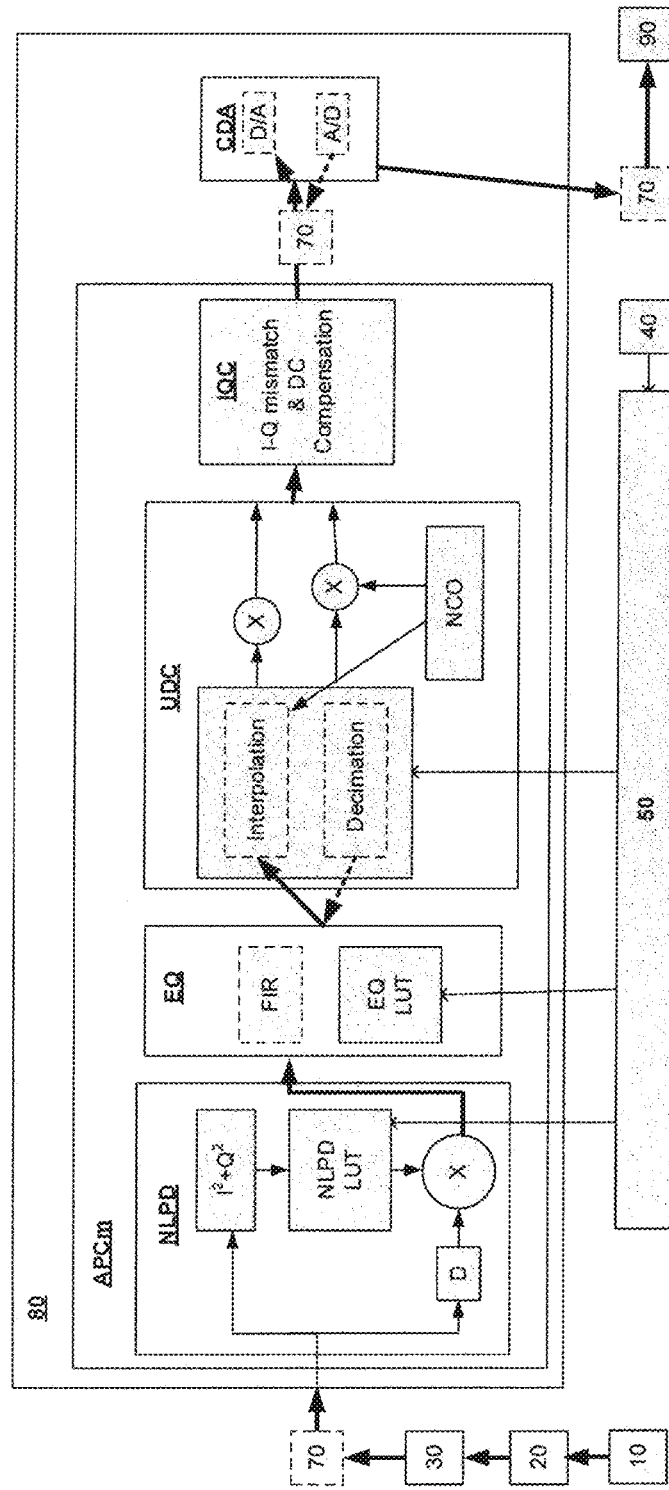
FIG. 1D is a block diagram illustrating in more details a digital compensation processing channel of the of the digital beamforming system 100 which is configured and operable according to the present invention for digitally compensating over various signal artifact introduced by an analogue e RF frontend connected to the system 100.

Reference is made now to FIG. 1D which is a block diagram schematically illustrating in mode details a digital processing channel APCm being one of the plurality 80 of digital processing channels 80 implemented in the chip/system 100 according to an embodiment of the present invention. For clarity additional elements/modules of the system 100 which are discussed in more details above are also illustrated schematically in the figure with bold arrows designating the signals propagation between the elements during transmission mode of operation, and light arrows designating control parameters provided to the digital processing channel APCm. It should be understood that for reception mode of operation, the signal would be propagating in the between the modules in the direction opposite to that illustrated by the bold arrows. It should also be noted that the modules of the digital processing channel APCm illustrated in the figure may be in some cases arranged in different order along the signal propagation path through the system 100.

As shown in the figure the digital processing channel $APC_m$ may optionally include a non-linear pre-distortion module NLPD configured and operable for adjusting an amplitude and phase of each symbol communicated through the digital processing channel $APC_m$ so as to compensate for a non-linear distortion applied to the symbol by an amplifier AMP of the analogue antenna channel $ACH_m$. The use of non-linear pre-distortion module NLPD may be specifically important in transmission operations in which the amplification levels required from the amplifier AMP may exceed the linear operational regime of the amplifier AMP. To this end, in implementations the system 100 dedicated to reception mode operation the non-linear pre-distortion module NLPD may be obviated.

Generally the non-linear pre-distortion module NLPD is operable per symbol (being represented by a time slot of the signal) that is transmitted through the processing channel $APC_m$, and as illustrated it is adapted to determine/compute the amplitude of the symbol (e.g. the amplitude of the signal's time slot representing the symbol). Here, an example in which the signal is processed in the I/Q representation and therefore the amplitude computation is illustrated in the figure as $A=I^2+Q^2$. The non-linear pre-distortion module NLPD is adapted for amplifying, attenuating the amplitude, and/or changing the phase of the transmitted symbol (time slot of the signal) by a complex factor CF which is derived from reference data NLPD-LUT based on the original calculated amplitude A of the sampled signal. The reference NLPD-LUT may generally be stored in the memory MEM of the BF-Logic processor 50, and/or it may be provided via the data port 40. The NLPD reference data NLPD-LUT may for example include a lookup table (LUT) and/or a function, such as polynomial, representing the non-linear response of the amplifier and/or possibly other non-linear components of the analogue antenna channel connected to the processing channel $APC_m$. As illustrated in the figure the non-linear pre-distortion module NLPD may include a multiplier configured and operable for multiplying the symbol/time-slot of the signal by the complex factor CF to thereby amplify, attenuate and/or shift the phase of the signal/symbol to compensate over non-linear distortions of the amplifier/antenna channel.

Additionally or alternatively the digital processing channel $APC_m$ may optionally include an equalization module configured and operable for adjusting respective phases and gains of different frequency components of the baseband signal communicated in between the digital baseband beam forming channel(s) 30 and a channel port 90 associated therewith in accordance with respective frequency response (e.g. phase shifts and gain variations) applied by the antenna channel, which is coupled to the respective channel port) to passband frequency components that correspond to different baseband frequency components of the baseband signal.

As indicated above, the baseband signal BB encodes a data stream of symbols. Generally a plurality (sequence) of symbols of in the data stream (baseband signal BB) defines one or more frequency components in the baseband signal BB. Those frequency components in the baseband are general associated with corresponding frequency components in the RF/passband which are affected by the antenna channels propagation the passband signals between the antennas 990 and the system 100. In turn, artifacts corresponding to the frequency response of the antenna channel are also expressed in the baseband signal. Advantageously, the equalization module EQ is configured and operable for digitally compensation for such artifacts to for achieving accurate beamforming. To this end the equalizers EQ of the different digital processing channels 80 are used to correct for non-flat frequency responses (associated with gain variations and phase shifts) of the antenna channels of the RF frontend 900.

Thus, in general an equalizer EQ is a filter, the purpose of which is to correct the frequency response (gain and amplitude) of the channel, so that the signals passing through it are not distorted. According to various embodiments of the present invention the implementation includes three processing stages:

i. Measurement of the channel frequency response.
ii. Determining the desired response of the equalizer
iii. Implementation of the desired response.

A possible implementation (called Direct Frequency Equalization), uses spectral analysis (FFT) of a sequence of symbols, out of which the channel frequency response can be determined. Assume the channel response is given by H(f). Let the desired channel response be given by D(f) (typically, a unit response within the passband of the signal). Thus the equalizer's EQ response W(f) can be defined according to the desired implementation. Typical responses of the are:

$$W(f) = \frac{D(f)}{H(f)}: \text{Direct inversion of the channel response}$$

And/or $$W(f) = \frac{D(f)}{H(f) + N_o(f)}: \text{Used to avoid high amplification}$$

of channel response nulls.

Where $N_0(f)$ is the noise density function, which is typically uniform.

Once the response of the equalizer is given, the implementation can be done in various ways:
1. By applying Fourier transform (e.g. FFT) to transform the series of symbols to the frequency domain, applied the frequency response filtration W(f) to the frequency domain, and applying Invers Fourier transform (e.g. IFFT) to transform back to the time domain (i.e. FFT-filter-IFFT implementation). Or
2. Utilizing a linear filter (e.g. FIR or IIR) of which the response is as W(f).

While this is a principal description of an equalizer, actual implementation of the equalizer can be made according to on of a plurality of algorithms known in the art, e.g. as described in J. Proakis: Digital Communications, and other text books and literature.

Generally the filter coefficients $w_n$ are provided as equalization reference data EQ-LUT for each of the digital processing channels 80. Typically the equalization reference data EQ-LUT (namely the fitter coefficients) are determined a-priory in accordance with the frequency responses of the antenna channels ACH1-ACHm of the frontend module 900 which is to be connected to the system 100, and are stored in a reference data memory (e.g. MEM) associated/included with the system 100. Then, the corresponding filter coefficients are provided as reference EQ-LUT to the respective equalizers EQ of the digital processing channels 80 in accordance with the antenna channel (e.g. ACHj to which each digital processing channel $APC_m$ is being connected The reference EQ-LUT may generally be stored in the memory MEM of the BF-Logic processor 50, and/or it may be provided via the data port 40. The EQ-LUT reference data NLPD-LUT may include the coefficients W of the Equalizer filter EQ. In this regards it should be understood that the filter coefficients are generally determined a-priory typically by utilizing the said algorithms to examine the frequency responses of the antenna channels of the RF frontend. In some implementations the equalizer coefficients are also determined to compensate for distortion in the radio propagation path or in the satellite as well.

As also shown in the figure the digital processing channel $APC_m$ may optionally also include an I/Q correction module IQC which is configured and operable for correcting I/Q mismatches in cases where the system 100 is adapted for processing an I/Q representation of the baseband signal BB. The I/Q correction module IQC configured and operable for compensating over at least one of gain and skew errors in the I/Q representation of the baseband signal that are communicated in between the digital baseband beam forming channel(s) and a channel port associated therewith. Additionally or alternatively, the I/Q correction module IQC may be adapted to compensate over DC offset values in the I and Q channels.

As illustrated in the figure the digital processing channel $APC_m$ may also include digital frequency converter UDC. In some embodiments the system 100 is configured such that the signals are provided by the channel ports 90 in the baseband frequency while up/down frequency convention may be implemented analogically (e.g. by a mixer MIX of the frontend module 900). In such cases digital frequency converter might not be required in the system. However in some embodiments, digital frequency convention is used by the system 100 in order to facilitate accurate and energetically efficient signal processing. In such embodiments, the digital frequency converter UDC are included in the digital processing channel $APC_m$ of the system 100.

As illustrated in the figure, in some embodiments the digital frequency converter UDC includes a numerically controlled oscillator (NCO) and multipliers for multiplying the signal with a reference frequency signal to thereby up/down convert the signal's frequency. Additionally an interpolation/decimation stage is used to adjusted the number of samples of the signal. Generally in implementations where only receive mode beamforming operation is implemented by the system 100, only decimation stage may be implemented for down converting the frequency of the received signal, and vice versa, in implementations where only transmit mode of beamforming operations are implemented, the interpolation stage is used to up-covert the signal. However in implementations designed for both receive and transmit modes the digital frequency converter UDC may be configurable to operate as a down-converter (in case of an ADC, on the receive direction), or an up-converter (in case of a DAC on the transmit direction).

Optionally, in embodiments in which the system 100 is configured such that the signals in the channel ports 90 are provided to the RF frontend 900 in an analogue form, the digital processing channel APCm also includes a converter CDA capable of converting the signal between the digital form by which it is processed by the system 100 and the analogue form by which it is provided at the channel ports 90. As exemplified in the figure, in embodiments operative for both receive and transmit modes of beamforming, the Analogue-Digital Converters CDA of the channel includes both Digital to Analogue Converter (DAC or D/A) as well as Analogue to Digital converter (ADC or A/D) which can be switched to operation in accordance with the direction of the signal propagation through the digital processing channel APCm in the receive and transmit modes. In implementations directed only to transmit or only to receipt mode of operation, the Analogue-Digital Converters CDA may include only D/A or A/D converter respectively.

It should ne noted that in some embodiments the sampling rate at which the system 100 (e.g. the beamforming channels 30 and/or the digital processing channels 80) operate may not be matching to the sampling rate of operation of the Analogue-Digital Converters CDA. In such embodiments, additional interpolation and/or decimation stages/modules, IntST and DecST, modules may be associated with the D/A and/or A/D converters to match the sampling rates thereof to that of the system 100.

To this end it should be noted that in various embodiments of the present invention, the system 100 is configured such that the operation of the modules of the digital processing channel APCm are controlled by a control unit 50. The latter is configured and operable to determine/compute the necessary parameters (reference data such as e.g. equalizer and/or non-linear distortion coefficients, as well as selectively operation the digital processing channel APCm in the receive/transmit modes, by appropriately switching the frequency converter UDC and the digital/analogue CDA converted to the appropriate mode as indicated above.

It should be noted that in the example of FIGS. 1C and 1D, the digital processing channels (e.g. APCm) and the beamforming channels (e.g. BFj) are configured and operable for processing the I/Q component of the baseband signal. In this example Each I/Q component of the baseband signal is treated/processed and delayed by the digital processing channels (e.g. APCm) and the beamforming channels (e.g. BFj), To this end the modules may optionally be implemented in a duplicate (e.g. one for processing the I component and a second one for processing the Q component).

Alternatively, in some embodiments the digital processing channels (e.g. APCm) and the beamforming channels (e.g. BFj) are configured and operable for processing a complex baseband signal not presented in the I/Q representation. For example the baseband signal samples at an intermediate frequency (IF), (converted previously digitally by a modulator) may also be applied. In this case the Q correction module IQC might not be required, and the complex gain module CGM may be implemented by a variable gain module plus a phase shifting element.

Typically for the same signal, I/Q implementation requires two paths with a given sample rate, while the IF implementation would require a single path albeit with at least double the signal sampling rate.

Figure 2:
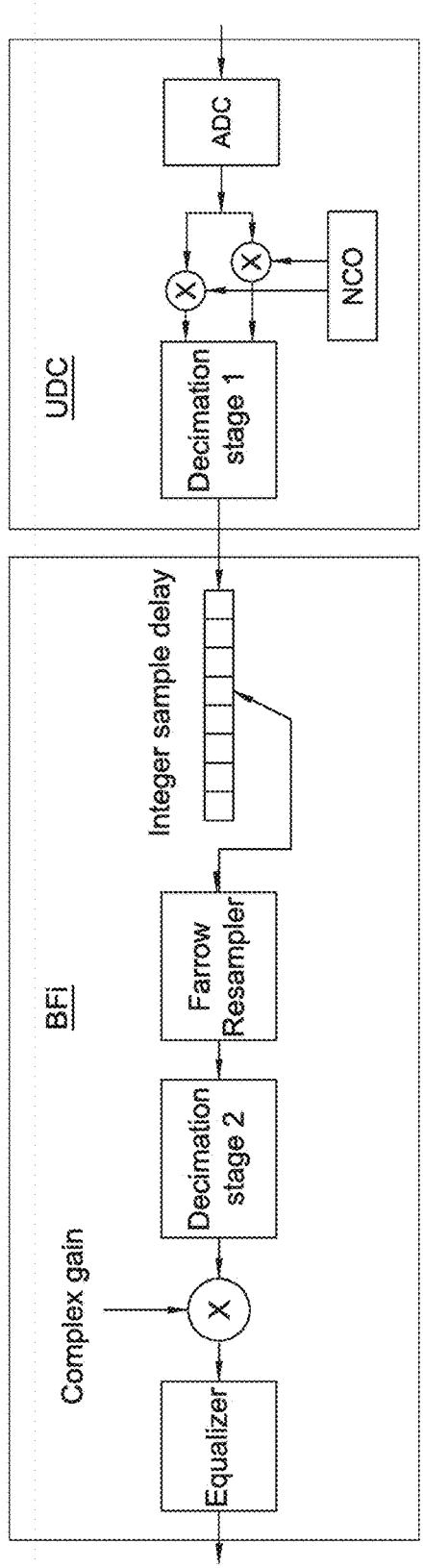
FIGS. 2 and 3 are block diagrams respectively illustrating a configuration and operation of modules of the beamforming and digital compensation processing channels of the present invention in, respectively, receive and transmit modes of operations.

FIG. 2 is a schematic illustration showing in self-explanatory manner the inner structure/function of the exemplified beamforming channel and digital processing channel operation together in transmission mode (TX) (e.g. to form together a transmission mode channel. Here not specific division is illustrated between the modules of the beamforming and digital processing channels). In this example, the input to the beamforming is a stream of In-phase and Quadrature (I/Q) samples of the modulated baseband signal. The digital domain consists of a basic multiplier to provide gain and phase correction suitable for a selected central frequency. This element preferably follows an interpolation stage in order to increase the sampling rate, and then by a true-time delay circuit, which is composed of a shift register used for buffering delays that are integer multiplications of the sampling time, and (in this example) is a Farrow re-sampler, used for delays that are smaller than the sampling time and to modify the signal sampling rate, if necessary. In the transmit path of this example, a Digital Pre-Distortion element is included which is capable of amplifying, attenuating and/or changing the phase of each of the I/Q samples by a complex factor derived from the original amplitude of the sampled signal via a Lookup Table (LUT), polynomial, or any other method known in the art per se which is adapted for compensating distortions caused by non-linear response of the amplifier or other non-linear components. An equalizer is then used to correct for non-flat frequency response in each chain, followed by an I-Q mismatch and DC compensation stage. The sampling rate is matched to the DAC rate by implementing another interpolation stage. The signal may then be digitally up converted to the output frequency in the up-conversion unit, which preferably comprises of a numerically controlled oscillator (NCO) and multipliers. A digital to analogue converter converts the signal to the analogue domain In this example, each I/Q component of the signal is treated independently, except for the I-Q mismatch circuitry and the complex gain element. Alternatively, samples of a single signal at an intermediate frequency (IF), converted previously digitally by a modulator can also be applied. In the latter case the I-Q mismatch circuit would not be applied, and the complex gain would be implemented as a variable gain plus a phase shifting element. Typically for the same signal, I/Q implementation requires two paths with a given sample rate, while the IF implementation would require a single path albeit with at least double the signal rate.

Figure 3:
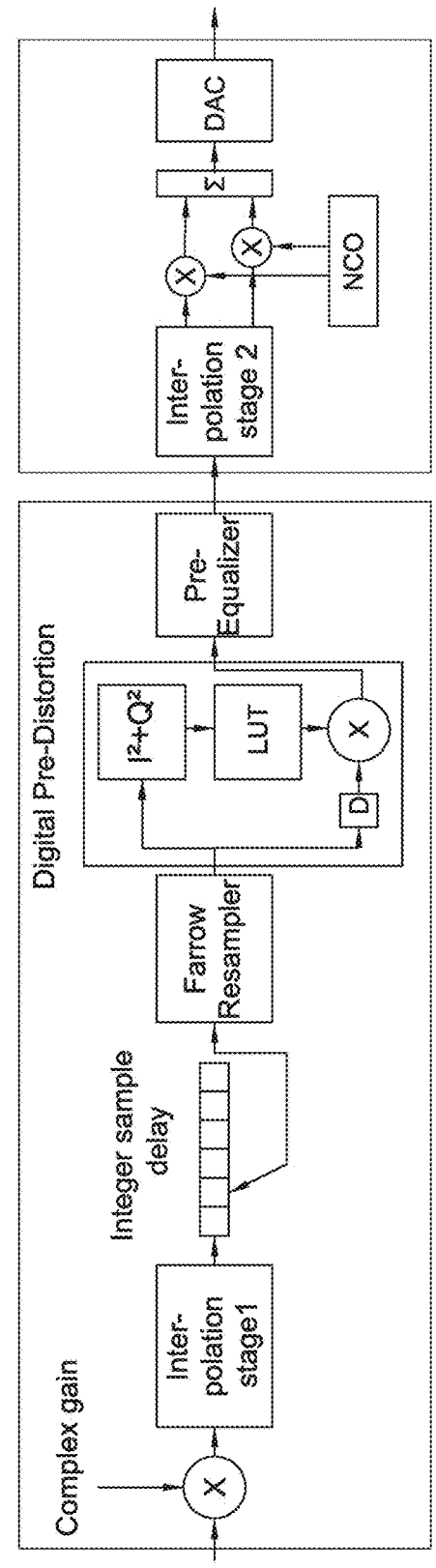

FIG. 3 is a schematic illustration showing in self-explanatory manner the inner structure/function of the exemplified beamforming channel and digital processing channel operation together in receiving mode (RX) beamforming (e.g. to form together a signal reception mode channel). Here no specific division is illustrated between the modules of the beamforming and digital processing channels. The analogue signal egressing from an RF chain (frontend 900) that is connected to an antenna element is sampled by the ADC, followed by a digital down converter, an I-Q mismatch correction and DC compensation stage. A decimator may then be used in order to reduce the sampling rate of the incoming signal. This is followed by a true time delay circuitry, a decimation stage, a complex gain and an equalizer, similar to the one presented in the RX beamforming. An alternative IF implementation is also possible.

According to various embodiments of the present invention, there is provided a scalable beamforming system/architecture that comprises baseband digital beamforming chips (100) and RF conversion chips (RFE chips 900), which can be connected essentially via a simple baseband analogue interface (e.g. via the channel prots of the BF chip 100. As a result, using two basic building blocks, the configuration enables, both on the transmit side as well as on the receive side, to construct large arrays having a large number of antennas and the formation of separate beams operating simultaneously (multi-beam configuration).

Thus, the size of the array may be enlarged by using a required number of the RFE building blocks. If a larger number of beams is to be supported BF chips can be added to provide the necessary signal processing for each of the beams. The connection between the building blocks is simple and can be easily extended as necessary. On top of that, there are no constraints in the design of any of the building blocks themselves as a function of the actual array size or the number of beams Additionally the digital compensation circuitry (the digital processing channels 80) included in the embodiment of the BF chip 100 makes it possible to correct for various impairments and errors inherently present in a construction of such arrays, as is known to those skilled in the art. This capability makes it possible to alleviate the requirements and hence the cost of the array itself. A typical example is the case of cable and connection path lengths to the elements within an array, which in traditional design need to be equal to each other with a very small tolerance, whereas such difference can be compensated digitally using the true-time delay circuitry, described above.

Figure 4A:
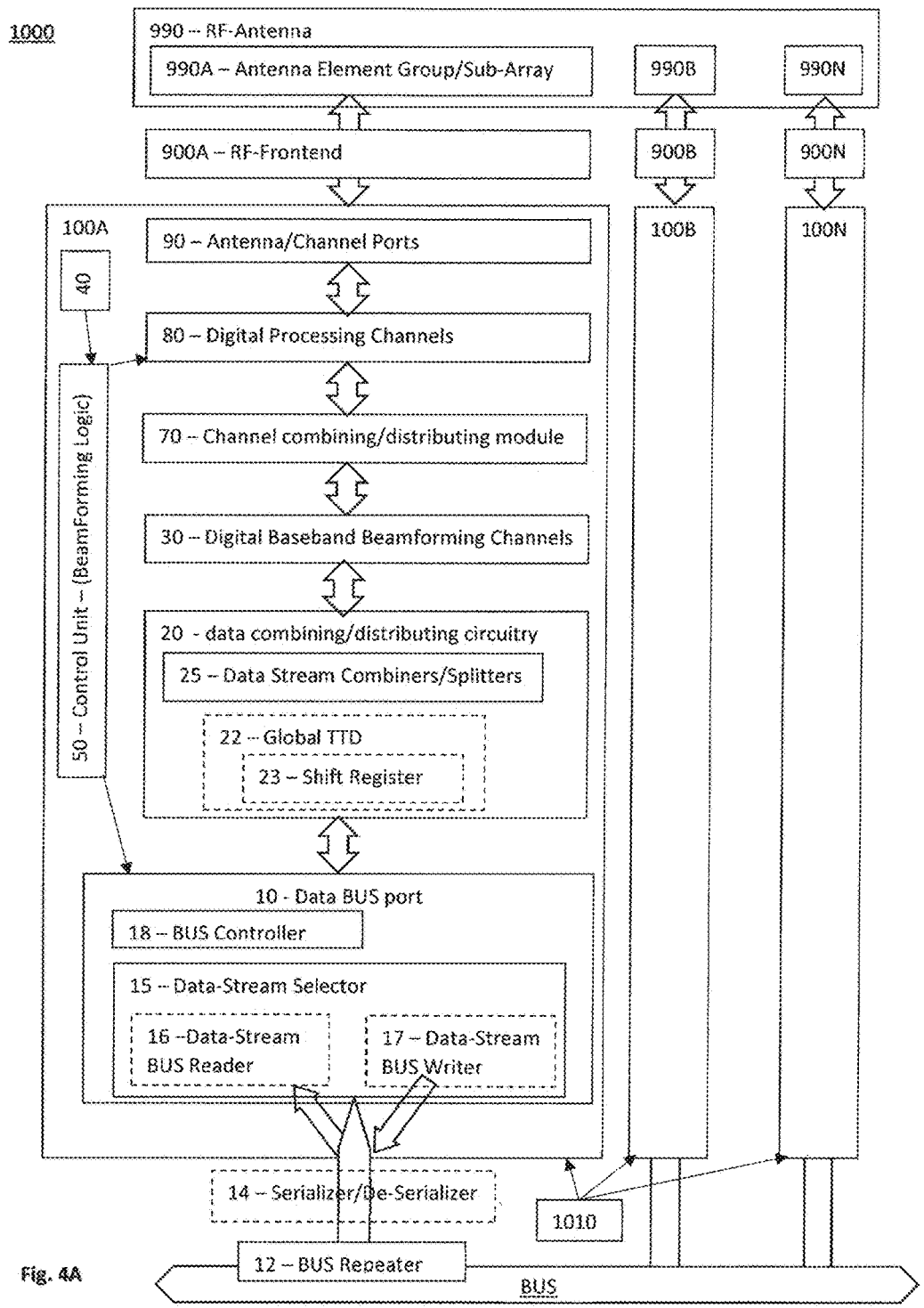
FIG. 4A which is a block diagram illustrating a scalable antenna beamforming system 1000 according to the present invention including a plurality of beam forming systems (chips) of the present invention connected to antenna elements of the antenna array.

Reference is now made to FIG. 4A which is a block diagram illustrating an antenna beamforming system 1000 comprising an antenna array 990 including a plurality of antenna elements (not specifically shown), and a plurality of N beam forming systems (chips) 100A-100N, which are configured and operable similarly to the beam forming system 100 described in any of the embodiments above, and are connected to the antenna array 990 via one or more RF-frontend modules 900, such that each of the beam forming systems (chips) 100A-100N is connected via its channel ports 90 to a respective group (e.g. subarray) 990A-990N of the antenna elements 990. It should be understood that in various implementations the group 990A-990N may be distinct groups (namely including distinct antenna elements such that no antenna element is connected to more than one beamforming chip), while in other implementations, further flexibility of possible beamforming functions (number, bandwidths, beam width and data rate of the received/transmitted beams) may be achieved by connecting one or more of the antenna elements to a plurality of channel ports 90 of one or plurality of the beam forming systems (chips) 100A-100N. In the latter case the groups 990A-990N are not distinct but some antenna elements may be associated with more than one of the beam forming systems 100A-100N. The channel ports 90 of the beam forming systems 100A-100N are typically connectable to the respective antenna elements 990 via one or more RF frontend modules, which may be for example configured and operable to define a plurality of analogue antenna channels (not specifically shown here) providing analogue signal processing chains communicating the signals between the beam forming systems (chips) 100A-100N and the antenna elements of the antenna array 990. In this regard it should be noted here that although in the figure there is shown a one to one correspondence between the beam forming systems (chips) 100A-100N and the RF-frontend modules 900A-900N, such one to one correspondence is not necessary and even one or few frontend modules may suffice as long as it/they have the required number of analogue antenna channels matching the required operative number of channel ports 90 to be operated by the beam forming chips 100A-100N.

To this end, in the present example the beam forming systems (chips) 100A-100N are configured and operable as basic building blocks usable for scalable construction of antenna systems 1000 of various required sized, which may have various numbers of antenna elements.

Figure 4B:
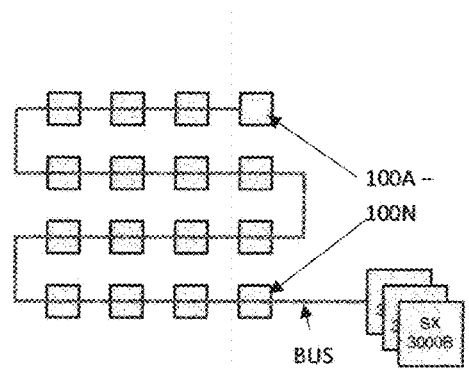
FIGS. 4B and 4C show two examples of configurations of a chain (e.g. cascade/tiling) connection of the beam forming chips of the present invention for controlling a large antenna array.
Figure 4C:
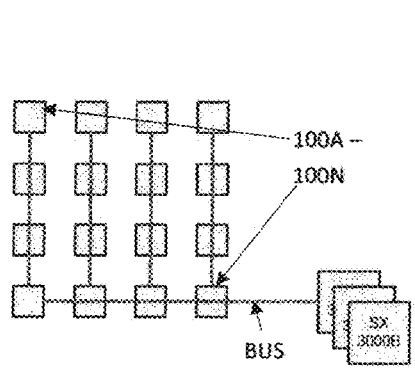

For instance, each of the beam forming chips 100A-100N may define a predetermined number m (e.g. m=32) of channel ports 90. Thus, by connecting the plurality of N beam forming chips 100A-100N, in cascade/tiling to a plurality of groups of antenna elements 990, an antenna (phased array) system with up to N*m antenna elements may be controlled for receiving/transmitting beam formed signals. For example FIGS. 4B and 4C show two examples of configurations of such cascade/tiling connection of the beam forming chips 100A-100N, for controlling a large antenna array 990. The beam forming chips 100A-100N are connected to modems (SX-3000B, in this figure) via common data BUSs BUS. FIG. 4B shows a daisy-chain topology/configuration of the connection of the beam forming chips 100A-100N along the BUSs, where data passes in series from one chip to the next chip, whereas FIG. 4C shows a "rake" structure/topology where data is passing in shorter daisy chains and collected/distributed together a common bus leading to/from the modem. Other connection topologies (e.g. cascade topology) are also possible to implement.

Tuning back to FIG. 4A, as indicated above the beam-forming chips (systems) 100A-100N illustrated in this figure each includes modules 10, 20, 30, 40, 50, 70, 80 and 90 which are configured/operable similarly to the respective modules of the system 100 described above. Accordingly the description of the configuration and operation of these modules will not be repeated here except for further description of the additional elements/modules that are implemented here to aid/facilitated in the scalable construction of antenna systems by utilizing the beamforming chips (systems) 100A-100N as building blocks.

The data combining/distributing circuitry/module 20 typically includes a plurality of data stream combiner/splitters 25 (e.g. typically matching the allowable number of simultaneous data streams which can be beam formed and communicated by the system at any given data rate). As illustrated for example in FIGS. 4D and 4E, in reception mode of operation, each data stream combiner 25 is configured and operable to combine/sum the data steams received be a plurality of the beamforming channels to form a single summed (e.g. beam-formed) data stream which is then fed/written to the BUS. In transmission mode of operation, each data stream splitter 25 is configured and operable for duplicating/distributing a data stream received by the BUS to a plurality of beam formers participating in the generation of the beam formed waveform which will carry/encode and transmit the data stream.

According to some embodiments of the present invention the combining/distributing circuitry/module 20 further includes a global true time delay module GTTD 22 which is configured and operable for introducing a global time delay to the plurality of data streams which are to be communicated by each chip. The GTTD module 22 is an important infrastructure module that facilitate a scalable antenna configuration utilizing the plurality of beamforming chips 100A-100N of the present invention. This is because the GTTD module 22 provides an efficient way for introducing a desired global time delay to all the data streams communicated/processed by the chip thereby allowing to synchronize the operations of the plurality of beam forming chips such that accurate beamforming can be collectively produced even for a very large antenna array 990 by the plurality of beam forming chips. To this end, considering that different beamforming chips 100A-100N may be associated with tiled subarrays 990A-990N of antenna 990 which span a large distance/separation between them, the signals processed by each of the chips should be collectively delayed in order to synchronize them with the signals of the other beamforming chips and compensate over the distances between the subarrays 990A-990N of the respective beamforming chips 100A-100N. This is achieved by the GTTD module 22 which may for example include a shift register SHR 23 (e.g. similar to that discussed above with reference to the TTD modules of the beamforming channels) but with larger capacity capable for storing the plurality of data streams processed by the beamforming chip and delaying them collectively by an integer sampling time of a predetermined value.

Optionally, in case time delay with resolution smaller than the sampling time is required, the GTTD module 22 may optionally be configured to include a time delayed re-sampler module (e.g. Farrow re-sampler) configured and operable for providing such high resolution time delays with fraction of the sampling time. To this end the operation of the GTTD module 22 may be similar to that of the TTD modules described above only with scale configured to accommodate the plurality of data streams processed by the beamforming chip (for storing them and collectively delaying them by up to a predetermine maximal global delay time). However it should be noted that this is optional and in fact in most implementations a time delayed resampling may not be needed at this level/stage and may be obviated/ replaced by the time delayed resampling with resolution smaller than the sampling time that may be performed in each beamformer channel. The GTTD basically provides for large time delays used to globally synchronize the operations of different beamforming chips 100 of the present invention.

It should be understood that control data indicative of the global delay time by which each chip 100A-100N should be delayed may be provided to the chip via the data port 40 from a global antenna controller connectable to the plurality of chips of the antenna array 1000.

Figure 4D:
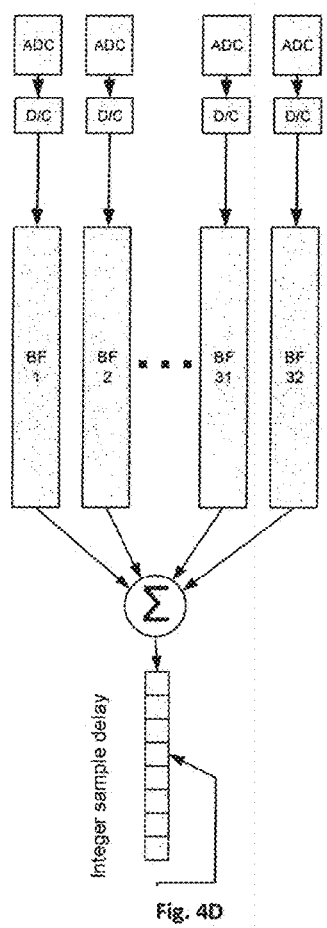
FIGS. 4D and 4E, illustrate schematically the operation of data stream combiner/distribution module (e.g. network/circuit) of the beamforming chip of the present invention during reception and transmission modes of operation respectively.
Figure 4E:
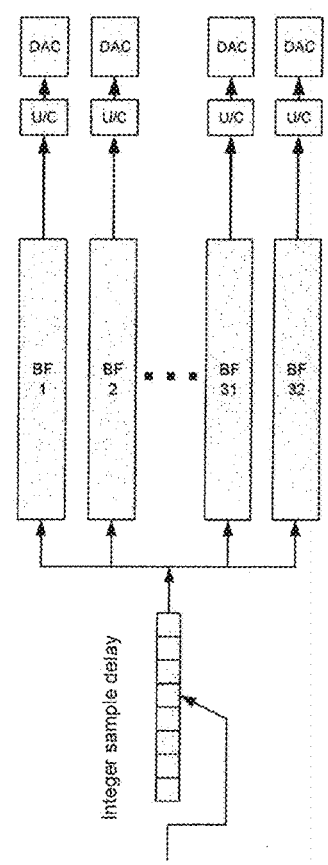

Thus, FIGS. 4D and 4E shows the additional (global TTD) including the integer sample delay register, which enables scalability of the design based on an ASIC for large antennas and/or for sparse arrays, for which a large delay may be accumulated along the bus and due to the distance that exists between the antenna's edges. Due to the ASIC inherent delay, the sample level integer delay in the beam formers needs to span only the relative delay between antenna elements that are connected to the same ASIC. FIG. 4D shows the integer sample delay at the output of a chip for the beamformer channels configured as receive channels, while FIG. 4E shows it for the transmit direction.

Figure 4F:
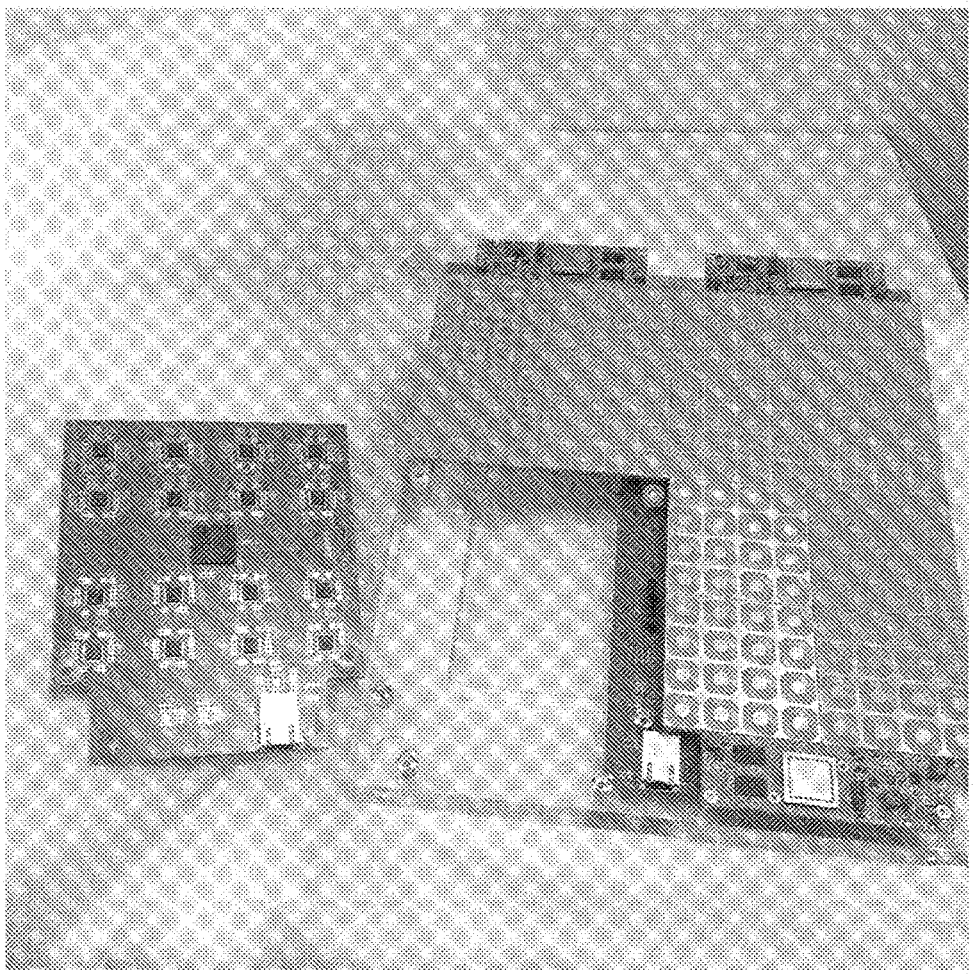
FIG. 4F is an image depicting an antenna system 1000 similar to that illustrated in FIG. 4A.

FIG. 4F is an image depicting an antenna system 1000 similar to that illustrated in FIG. 4A. The antenna system includes an array of 256 (16×16) antenna elements 990, which comprises a plurality of 8×8 tiles (subarrays 990A-990N where N=8). In the image the backside of one of the tiles is shown with the digital beamforming chip 100 is located in this example in the middle of the backside of the tile for applying digital baseband beamforming in the digital domain as described above. Additionally 16 radio frequency frontend (RFE) chips each providing 4 analogue RF antenna channels for 4 antenna elements of the subarray are shown in the backside connected in-between the chip 100 ant the respective antenna elements.

Figure 4G:
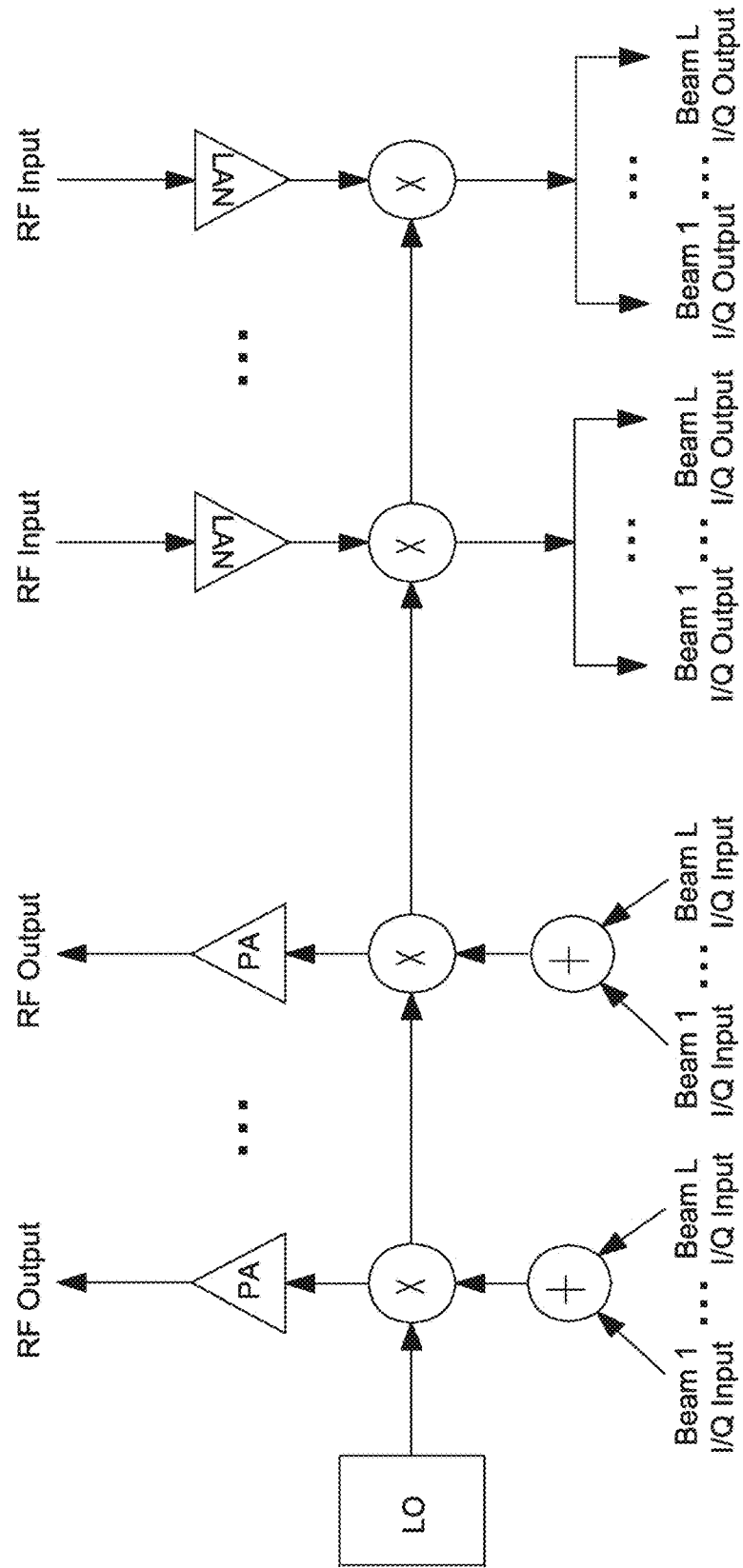
FIG. 4G is a schematic illustration exemplifying an RF Frontend (RFE) module which can be connectable to the channel ports of the beamforming chip of the present invention.

An example of the configuration of an RF Front end (RFE) module 900 which can be connectable to the channel ports of the beamforming chip 100 of the present invention is illustrated in self-explanatory manner in FIG. 4G.

In this example The RFE 900 comprises a plurality of TX paths and a plurality of RX paths (L in this example). As depicted in the example of FIG. 4G, a TX path comprises two reconstruction Low Pass Filters (LPFs), direct up converter from I-Q (or IF) to the required band, a Variable Gain Amplifier (VGA), a Power Amplifier (PA). Possibly, certain RF filtering might also be required. A RX path, as shown in the example of FIG. 8, comprises Low Noise Amplifier (LNA), a VGA, direct down converters from the desired frequency to I-Q (or IF), two anti-aliasing filters that are preferably used before a signal sampler, to restrict the bandwidth of a signal. Here again, a certain RF filtering might also be required. The local oscillator (LO) system demonstrated in this figure comprises two Phase Locked Loops (PLLs), namely an RX and a TX which are locked to an external synthesizer. A RX/TX switch (not shown in this figure) is used for each of the RX/TX pairs (16 in this example) depending whether that RX/TX pair is currently in a transmitting mode or in a receiving mode.

Figure 4H:
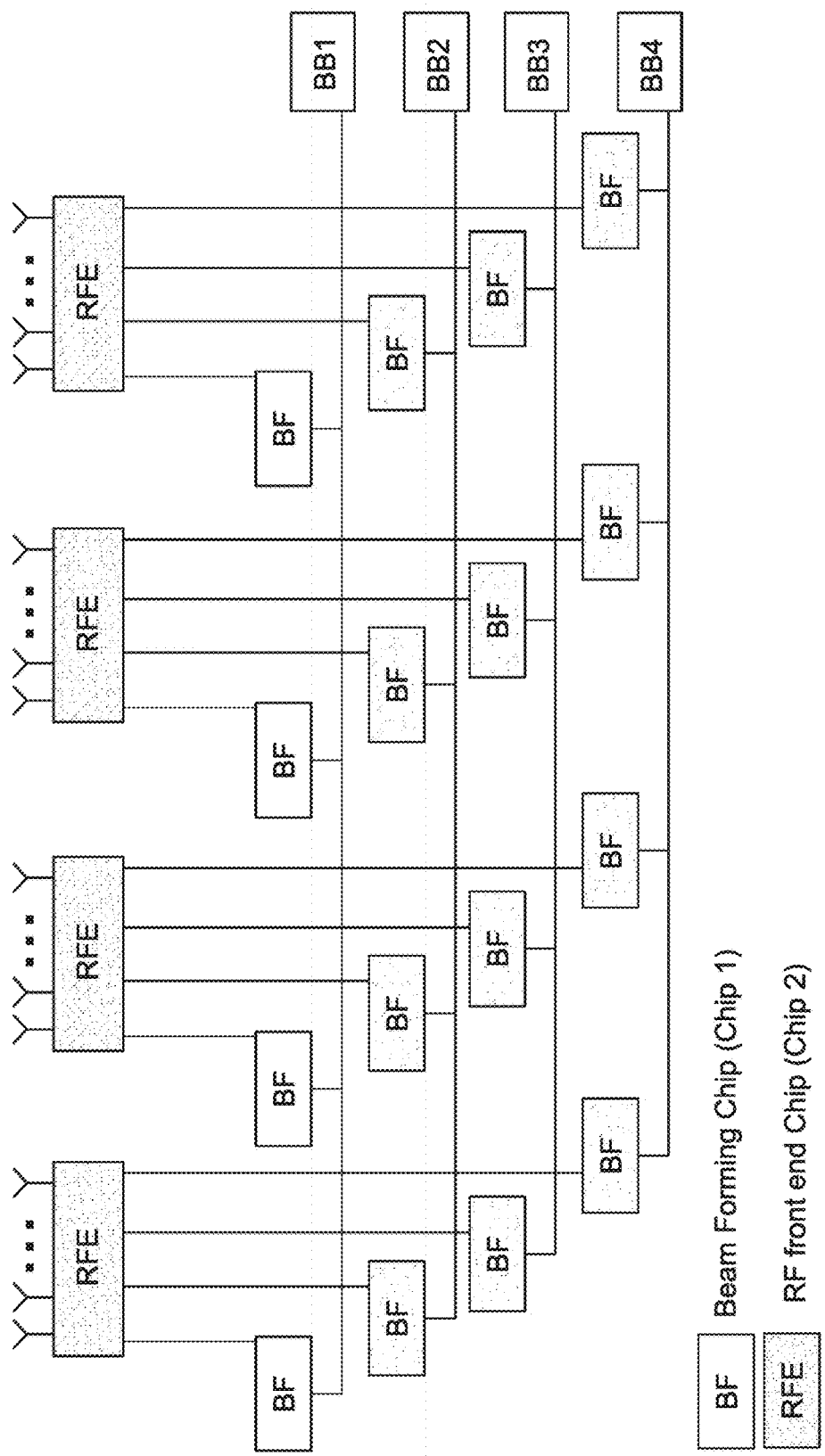
FIG. 4H illustrates the configuration of chip set including beamforming chips and corresponding RFE(s) according to an embodiment of the present invention.

As illustrated in FIG. 4H chip set (including beamforming chips 100 and corresponding RFE(s) 900) may be connected and chained, to enable its use in multibeam operation and/or in larger arrays. To this end, FIG. 4H exemplifies possible connections that are used to form a four beam, 64 elements array, using beamforming chips, each supporting a single beam and 16 elements, and RF chips, each supporting 16 elements as well. 16 beamforming chips are deployed in this configuration that requires four RF front end chips. On the transmit side, the modulated digital baseband signal is formed by the baseband modulators (BB1, BB2, BB3 and BB4). Each output is chained (via SerDes, e.g. JEDEC JESD204B) to four beamforming chips. It should be noted that in this particular example the outputs of the beamforming (BF) chips that belong to a given group of 16 elements, are summed by a RF front end chip to drive the elements. Thus the signal summation in this example is an analogue summation performed in the baseband.

On the receive side, the antenna outputs of each group of elements are distributed among all the BF chips that support the elements that belong to that group, where each of these elements is configured to provide the relevant digital output resulting from the proper summation of the elements outputs. The outputs of the BF chips belonging to the same beam are chained to each other and summed to form the beam baseband chip input.

As will be appreciated by those skilled in the art, the elements of the RFE, may be implemented as part of the beamforming chip on a single die. Alternatively, the components of the beamforming chip may be implemented on a different die.

Tuning back to FIG. 4A, in the present example, since the beamforming chips 100A-100N are designed to connect a common BUS, the bus data ports 10 of the respective beamforming chips 100A-100N may include Data-Stream Selector 15 which is configured and operable to appropriately reading/writing the data-streams to be communicated between the chip and the BUS in synchronisation of others of beamforming chips 100A-100N. More specifically, a beam forming chip 100A, which is configured and operable for transmission operation, may include a data stream BUS reader 16, configured and operable for receiving control instructions (e.g. from the bus-controller 18) for extracting from the BUS only the data-streams pertaining to be processed (digitally beam-formed) and transmitted by the respective chip. This provides for not overloading the chip with data pertaining to other of the beamforming chips in the system. Alternatively or additionally, a beam forming chip 100A, which is configured and operable for reception operation, may include a data stream BUS writer 17, configured and operable for receiving control instructions (e.g. from the bus-controller 18) for writing the data-streams received from the antenna 990 and digitally beam-formed by the chip 100A to the BUS in synchronization with writing operations of other beamforming chips connected to the BUS (namely in the correct writing order/timing) so as not to cause data collisions between the data streams possibly written of the plurality of beamforming chips 100A-100N to the BUS.

Additionally, the antenna beamforming system 1000 includes a bus repeater 12 per each forming chip which is connected to the common BUS. When the chips are operated in transmission mode, the bus repeater 12 duplicate/repeats the signals (data-streams) communicated on the BUS manner to allow the Data-Stream Selector 15 of each beamforming chip (e.g. 100A) to acquire/read from the BUS the data streams pertaining to it, while repeating/continuing the communication of the data-streams to other beamforming chips connected to the BUS. When the chips are operated in reception mode, the bus repeater 12 aggregates the signals (data-streams) written by the Data-Stream Selector 15 together with, and without interfering to, the other data streams communicated in the BUS. In some implementations the bus repeater 12 is included/integrated in the beamforming chips 100A itself (e.g. as part of the bus data ports 10) to facilitate direct connection of the chip to the BUS.

In some embodiments the order to facilitate high data rates of signal communication to the plurality of beam forming chips 100A-100N connected to the BUS, the BUS is configured and operable for high-volume parallel data communication, while the beam forming chips 100A-100N may be adapted to operate with serial data communication. Accordingly each of the beam forming chips 100A-100N may be connected to the BUS via a serializer/de-serializer module (SERDES) 14 for converting between the parallel signal communication over the BUS and the serial signal communication to/from the beam forming chips 100A-100N. In some implementations the serializer/de-serializer module 14 may be included in the beamforming chip 100A (e.g. coupled to the bus data ports 10, and possibly integrated with the bus repeater 12.

According to various implementations the bus data port 10 of each beamforming chip 100A also includes a BUS controller module 18, which is adapted to receive, from the data port 40 and/or from the BF-Logic Processor 50, control signals indicative of the data streams to be written/read from the BUS. Accordingly the BUS controller module 18 is configured and operable to synchronize the timings of the processing of the respective data streams by the so as to allow correct beamforming. This may be specifically important in cases where the chip is operated in transmission mode which receiving the data streams over serial communication. In that case different data streams are received by the chip one after the other (e.g. or in interlaced fashion) thereby yielding delays between different data streams that may need to be communicated simultaneously. The BUS controller module 18 may be adapted to postponed the processing of such data streams so as to compensate for the time lags between them and allow simultaneous/synchronous processing thereof.

Figure 5:
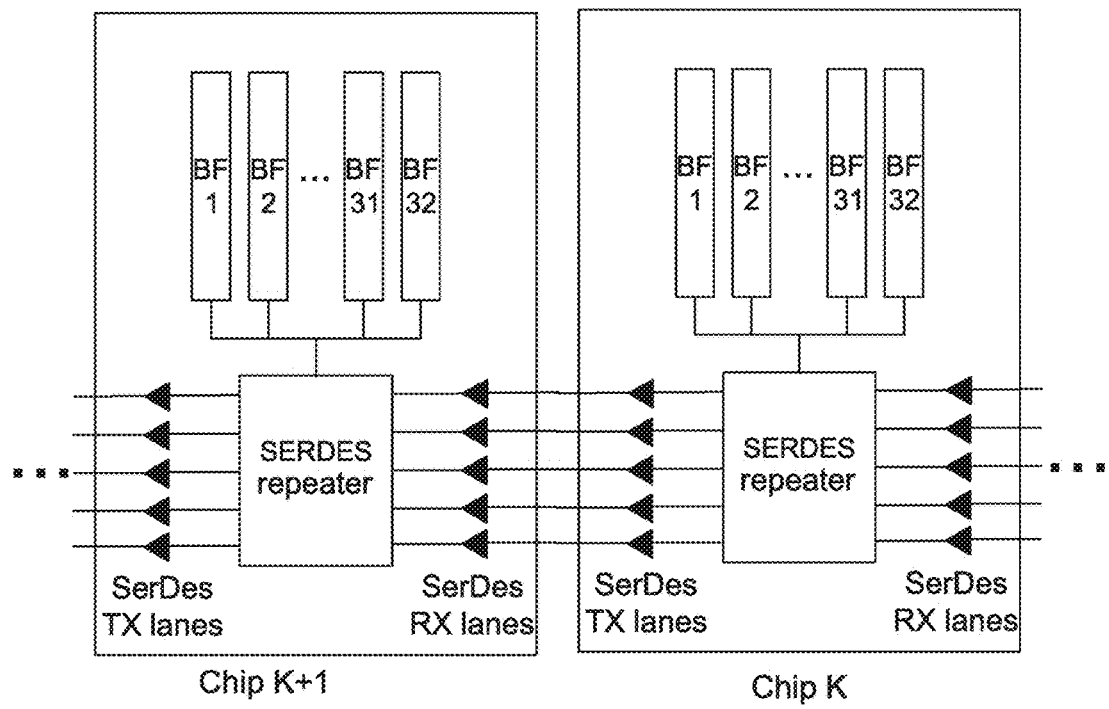
FIG. 5 exemplifies in self-explanatory manner the principle of operation of the a plurality of beamforming chips k, k+1 of the present invention connected to a data bus.

FIG. 5 depicts the principle of operation of the a plurality of beamforming chips k, k+1 connected to the data bus via a SERDES repeater and operated for transmission operation. Also the operation of the combination/distribution modules 20, of the chips k, k+1 is also illustrated when they are configured for distribution in the transmit direction. The serial interface at the input of a chip (Chip k in the figure) is distributed to each of the beamformers and also to the output of the chip k, which can be further forwarded to the next chip k+1.

Figure 6:
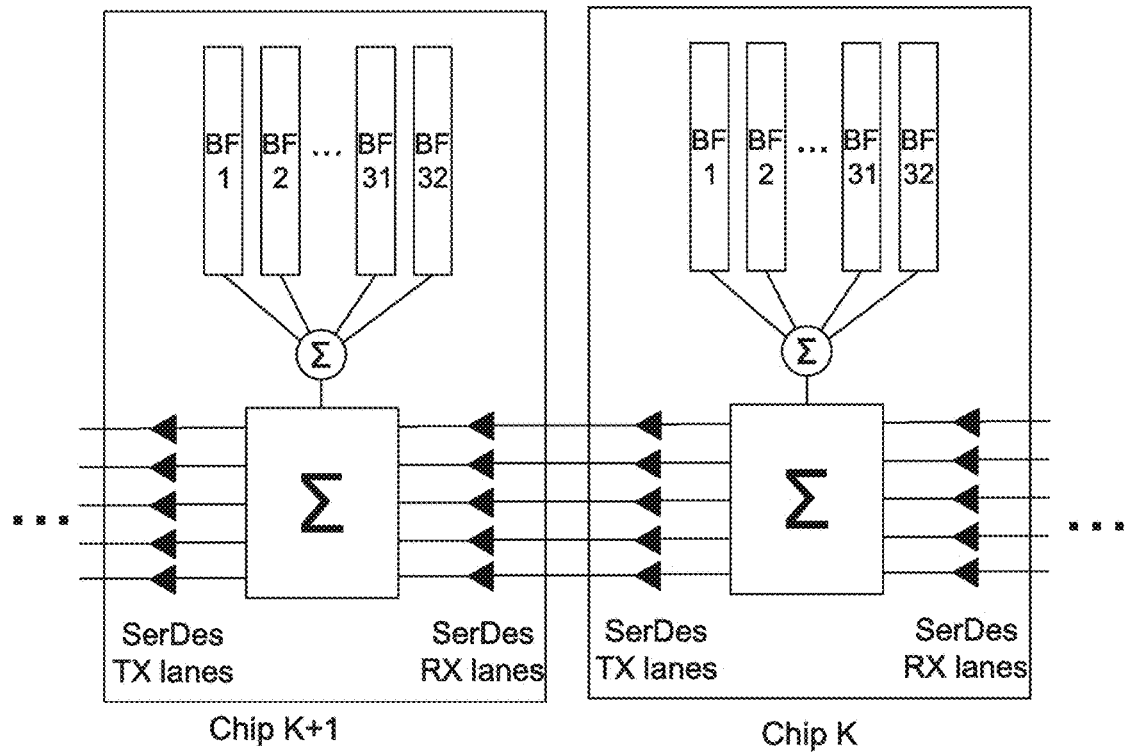
FIG. 6 exemplifies in self-explanatory manner the principle of operation of the combination/distribution module, when operating in the receive mode.

FIG. 6 depicts the principle of operation of the combination/distribution module, when it is configured for combining in the receive direction. In this case the input digital interface of the chip is summed together with the output of all the beamformers within the chip (Chip k in the figure) and the result is outputted to the next chip.

As will be appreciated by those skilled in the art, the data rate carried across from chip to chip is identical at the input and the output. In a distribution mode it is the same signal which is distributed, whereas in the combining mode, the signals are summed sample by sample.

Figure 7:
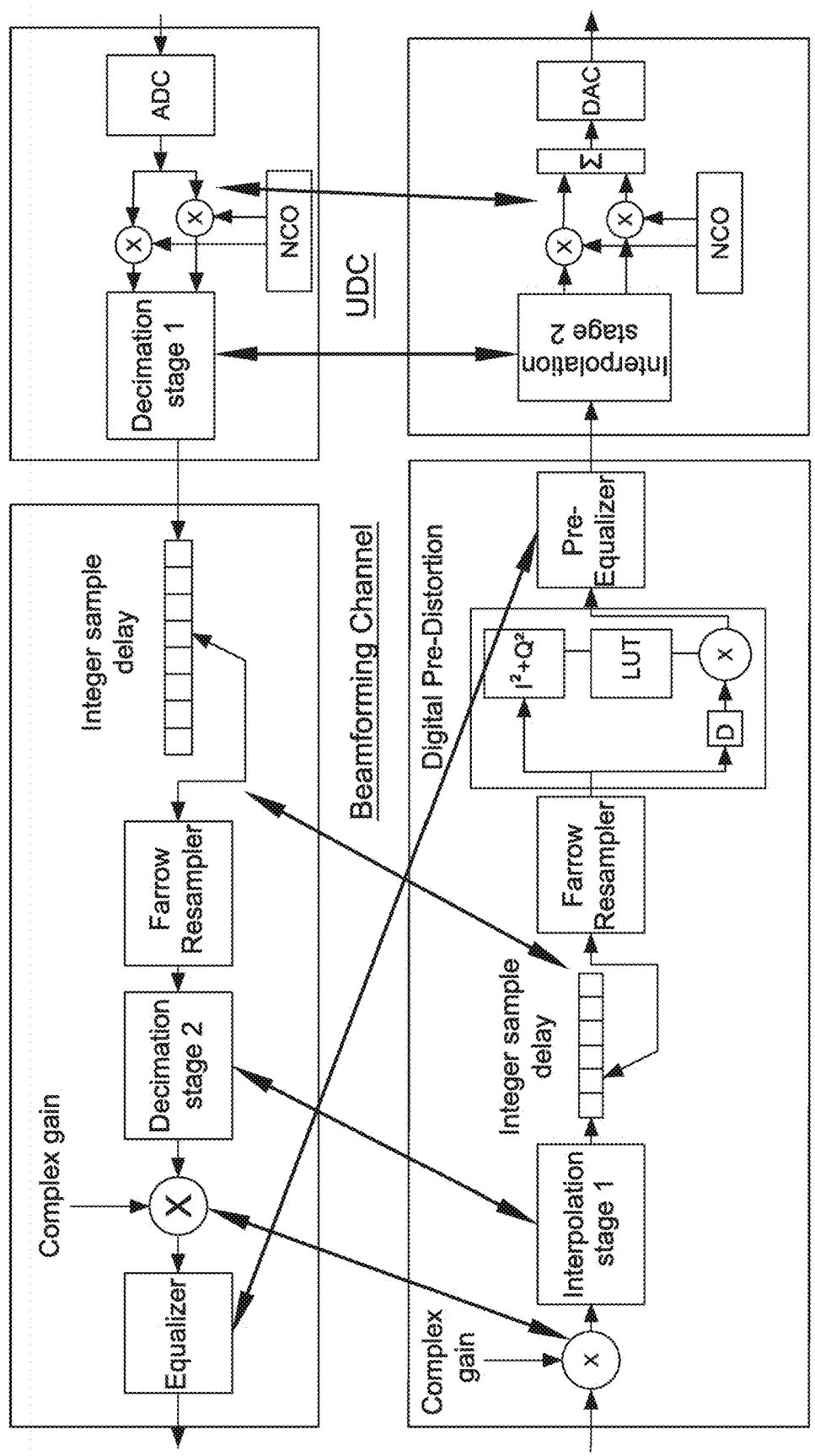
FIG. 7 illustrates in self-explanatory manner the correspondence between the operation of the modules of the beamforming channel of the invention in transmit and receive beamforming modes.

Thus the present invention provides a novel flexible beamforming system chip which can be scalable to antenna/phase-arrays of various sizes. The system includes baseband digital beamforming chip(s) 100 (BF chip(s)) and separated front end RF conversion chips (RFE chips). The architecture of the baseband digital BF chip provides a degree of flexibility that is limited only by the total data rate of the data input/output (e.g. serial data input/output) port 10 of the BF chip. Under those constraints the architecture enables:

Flexible allocation of Tx, Rx and combination of TX/Rx channels (TDD)
Flexible number of beams
Flexible antenna configuration
Flexible polarization control—by utilizing antenna elements of various polarizations and selectively implementing the beamforming of each data-stream by connecting/utilizing the selected antenna elements of the desired polrisations.
Flexible input/output operation frequency
Additional functionality FIG. 7 illustrates in self-explanatory manner the correspondence between the operation of a beamforming channels in Tx and Rx beamforming models. The arrows connect components which are implemented identically when combined in the Tx or Rx path. Thus, each beamformer channel BF1-BFN of the beamformer pool 30, may be configured to independently as a Tx, as an Rx beamformer and/or as dual operation beamformer channel selectively operable in both Rx and Tx modes. It is also possible to change the configuration in time for a Time Division Duplex (TDD) operation.

Figure 8A:
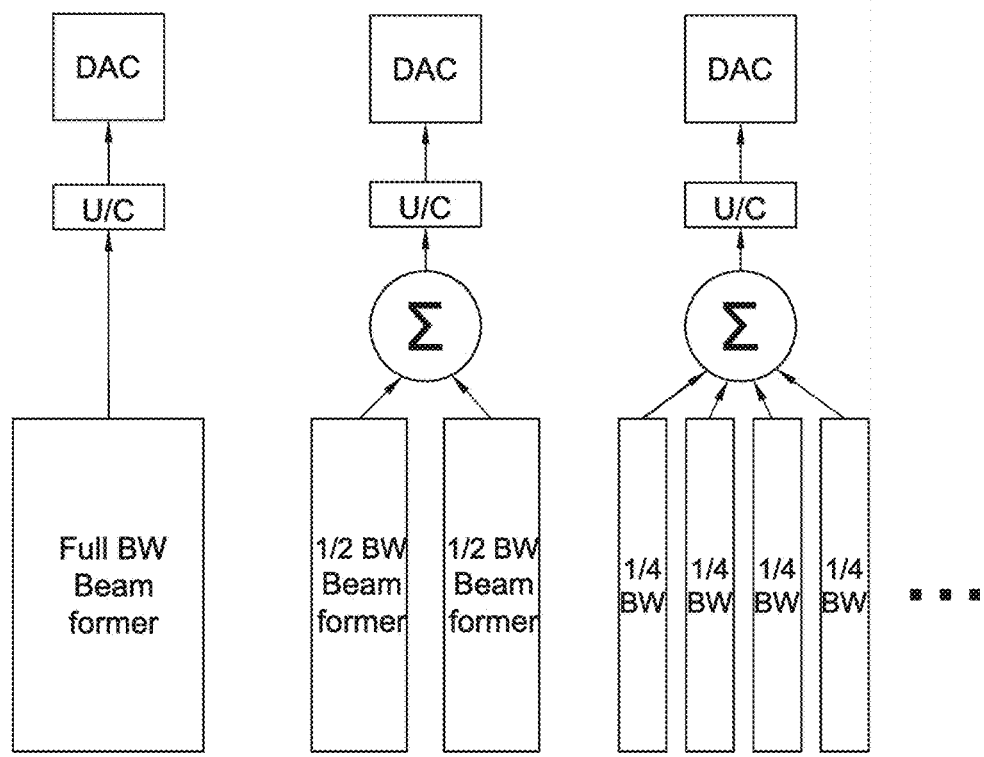
FIGS. 8A and 8B illustrate configurations of a number of beamformer channels for producing a number of beams, under a limitation derived from the total available bandwidth (BW)
Figure 8B:
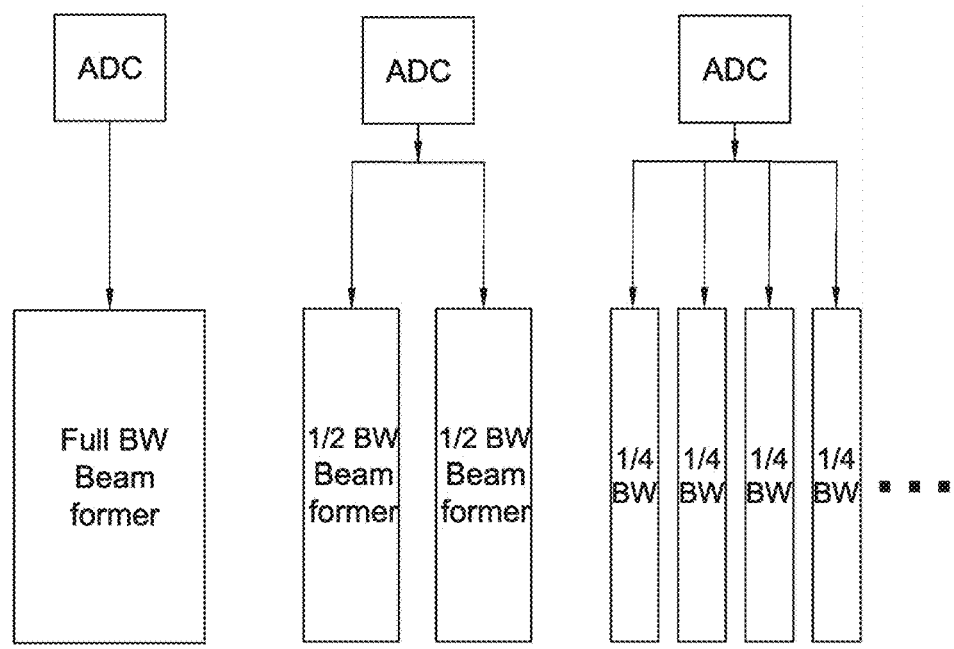

FIGS. 8A and 8B illustrate how the number of beamformers, and hence the number of beams, can be reconfigured under a limitation derived from the total bandwidth (BW) available, which is proportional to the data rates that pass through the chip. If the bandwidth is large, a single beam can be formed. For a narrower bandwidth, several beams can be formed while using the same hardware. FIG. 8A shows the flexible configuration in the Tx direction, while FIG. 8B shows the flexible configuration in the Rx direction.

Figure 9A:
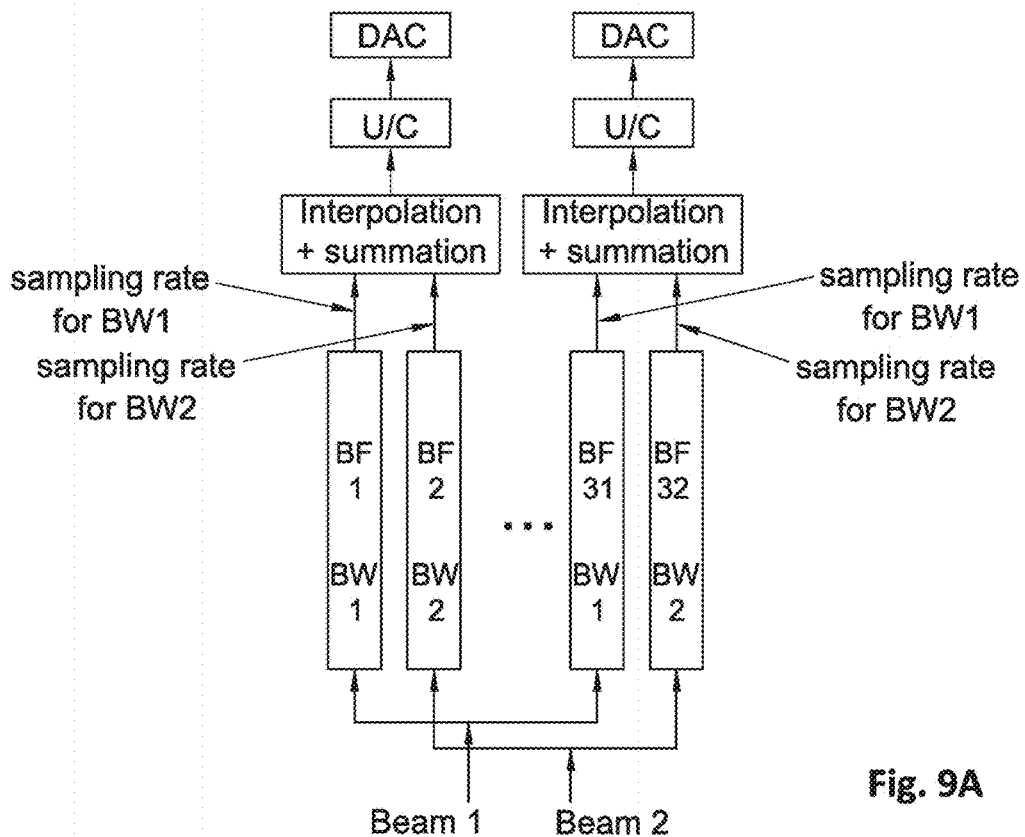
FIGS. 9A and 9B illustrates the allocation of beamformer channels s to beams in the case of a single beam and for the case of two beams in which the bandwidth of each beam is different from that of the other.
Figure 9B:
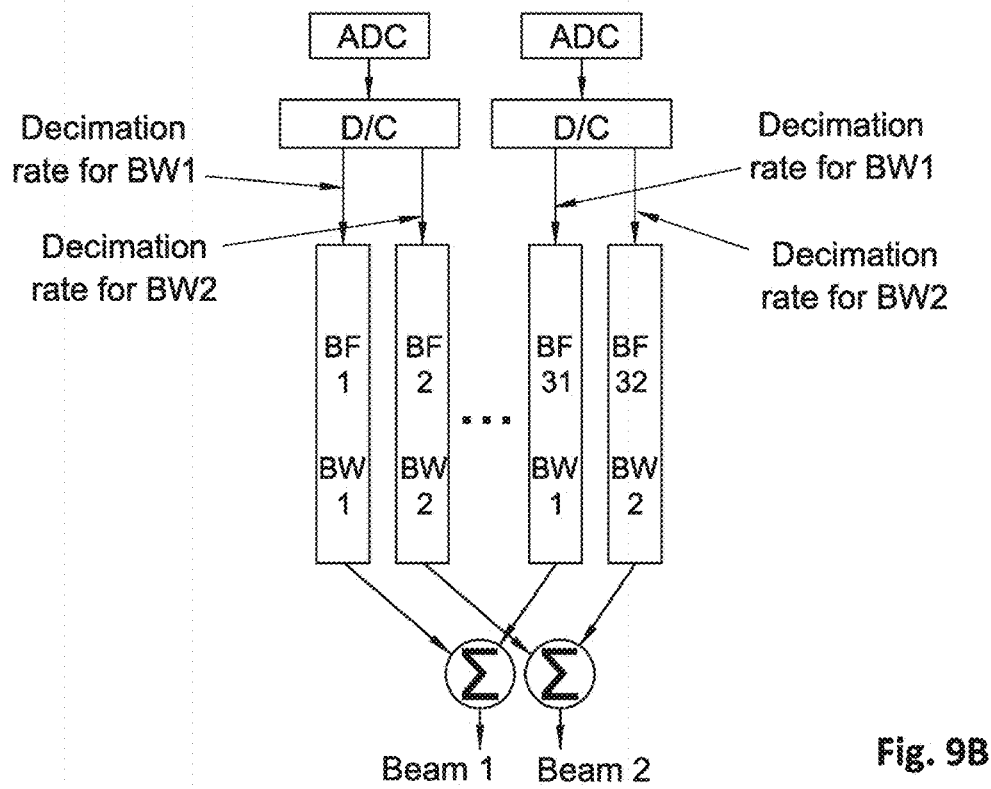

FIGS. 9A and 9B illustrates the allocation of beamformers to beams in the case of a single beam and for the case of two beams in which the bandwidth of each beam is different from that of the other. In the latter case, each beam uses a different decimation rate commensurate with the relevant beamwidth. FIG. 9A shows such a configuration in the Tx direction, while FIG. 9B shows such a configuration in the Rx direction.

Figure 10:
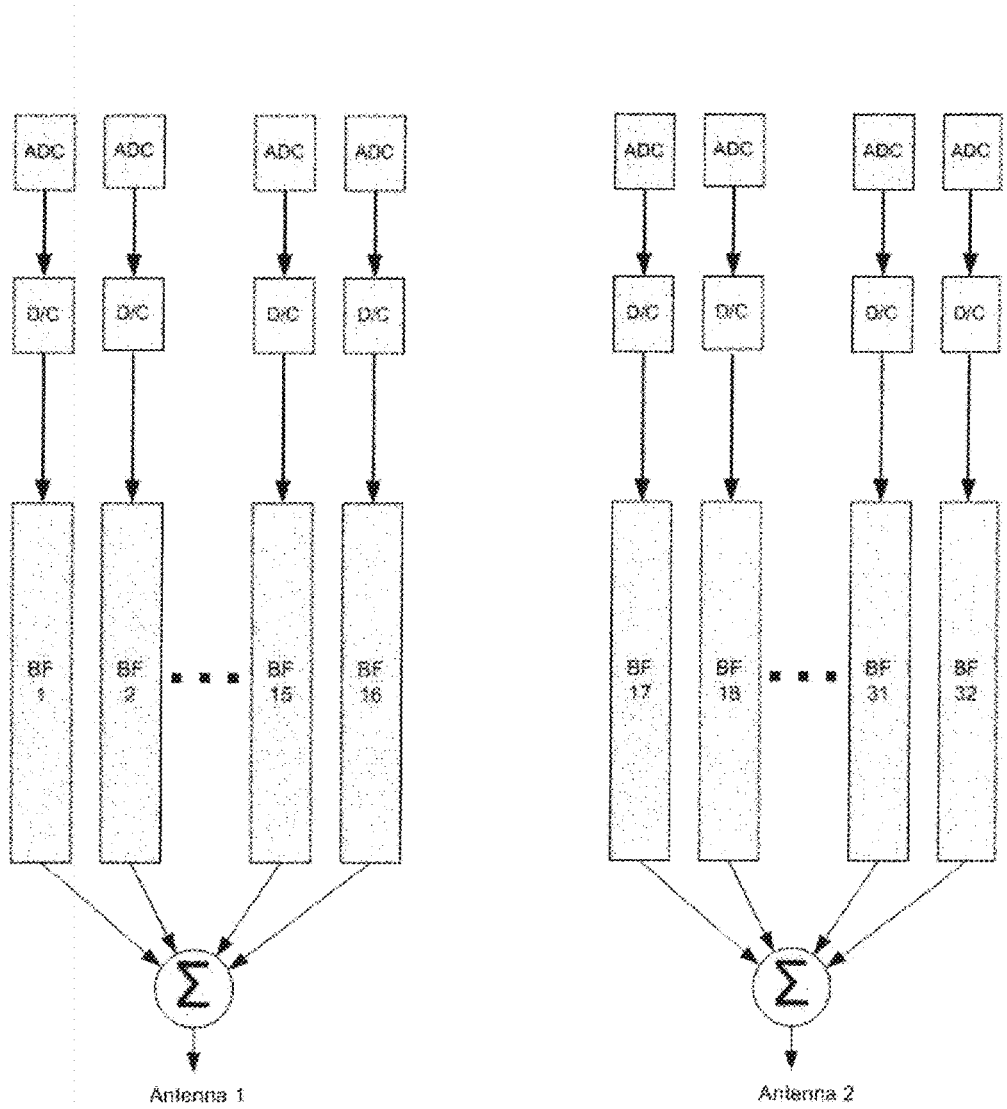
FIG. 10 demonstrates a full array configuration in reception mode wherein the signals from each antenna element are distributed to all the beamformer channels and combined.

The array may be configured as a full array, wherein the signals from each element are distributed to all the beamformer channels, and the signals from all the beamformers are combined in each element. It is also possible to configure the elements as sub-arrays, where only a smaller set of elements is connected to some beamformers, while other elements are connected to other beamformers thus forming smaller independent antennas. FIG. 10 demonstrates an embodiment of such a connection possibility.

Figure 11:
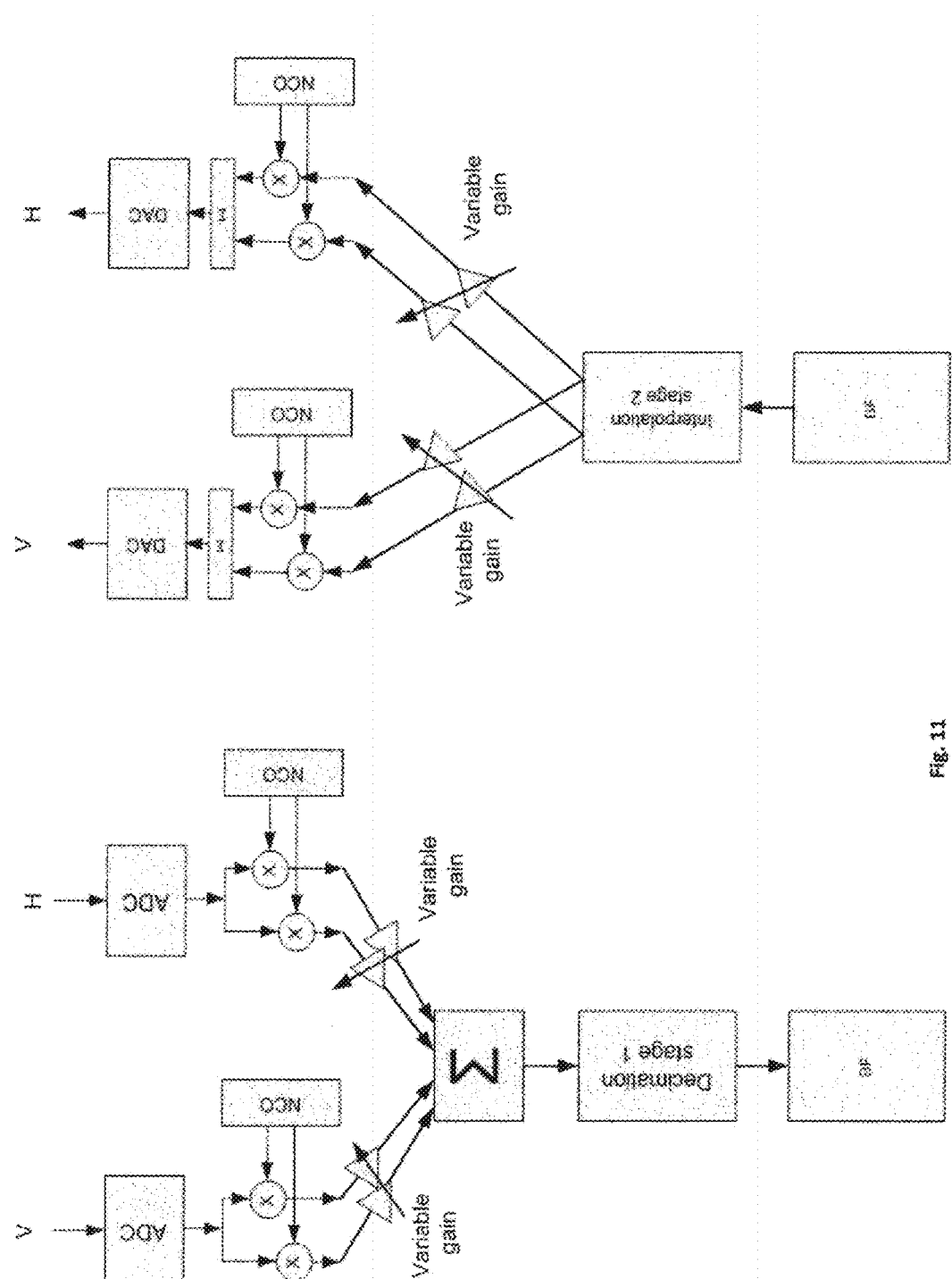
FIGS. 11 and 12 are schematic illustrations demonstrating the configuration and operation of the system of the invention for respectively formation of linear polarization waveform/signal pattern in any required angle and formation of a circular polarization.
Figure 12:
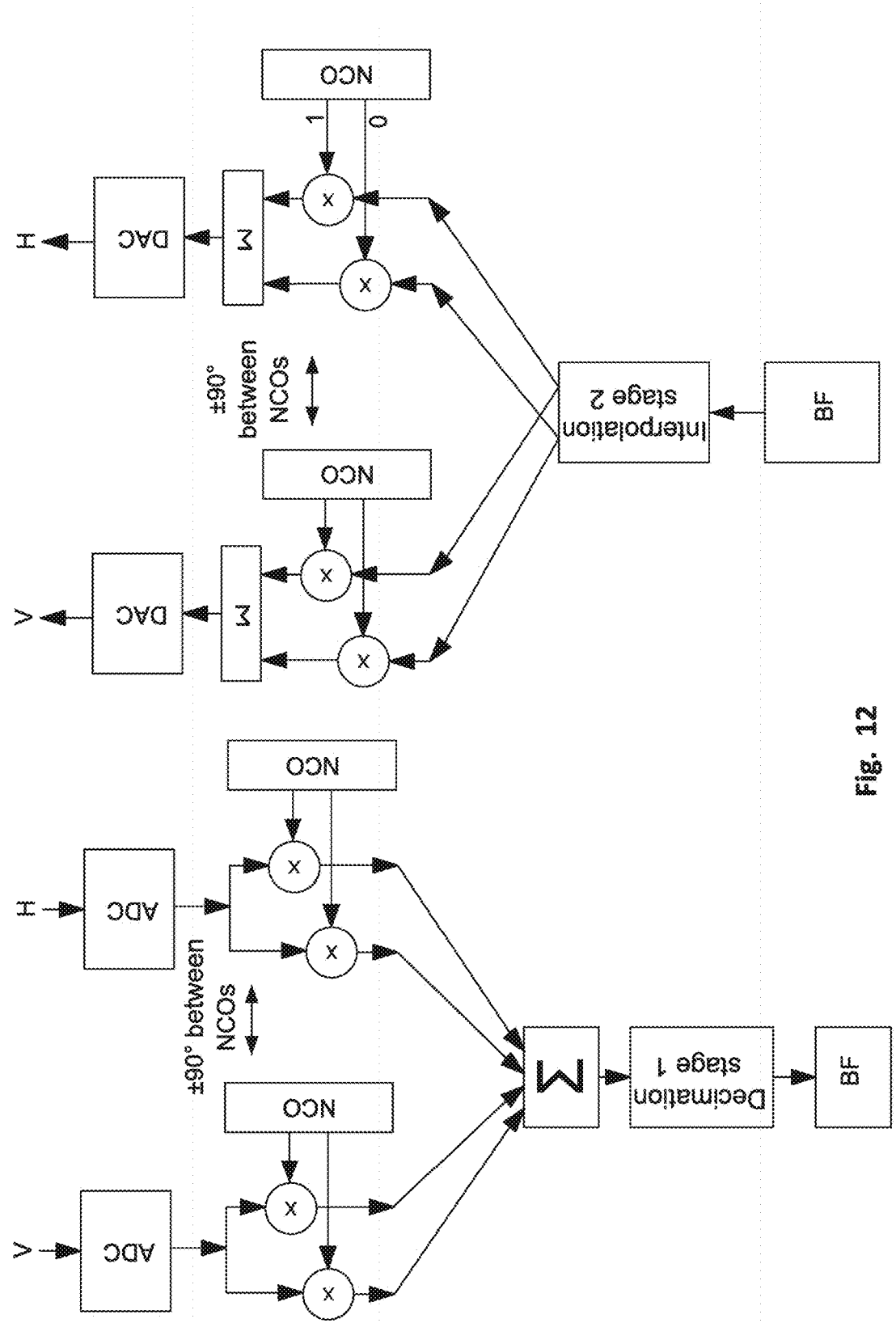

If a dual polarization is required, the antenna array should have elements of both polarization directions (typically linear vertical and linear horizontal polarizations), which are typically implemented within the same antenna element having two feeds. The vertically polarized elements can be connected to one set of ADC (and DAC), while the horizontally polarized antenna elements are connected to a second set of ADC (or DAC). Any polarization can be formed by these two connections. FIG. 11 shows the formation of linear polarization in any required angle by combining those two signals in phase with a variable gain between them. FIG. 12 demonstrates formation of a circular polarization by using a 90 degrees phase shift between the signals.

On the receive side, the RFE converts the received RF signal to a lower frequency, an intermediate frequency (IF), which can be processed by the Digital Beamforming chip, which samples it and converts it down to the baseband. The RFE can also convert the RF signal to the baseband (zero IF). In this case, the conversion is made to two signals (In-phase and Quadrature, I/Q), where each of them has to be sampled by the ADC separately.

An example configuration of the input ADCs is illustrated in FIG. 13A. In this figure, one ADC is allocated to the I signal, while the other one to the Q signal. Further frequency correction can be made by the NCOs connected to each ADC, however only one branch of the I NCO output is used as the I input and the quadrature branch of the Q NCO is used for the Q output.

On the transmit side, a reciprocal procedure is performed, as described in FIG. 13B. Each of the I and Q outputs is a frequency shifted (if necessary) by two separate NCO's and then up-converted in the RFE.

The sampling frequency of the ADCs and DACs, might be lower than that of the IF frequency, provided the bandwidth of the sampled signal is small enough. This procedure, also known as sub-Nyquist sampling can also configured on the Digital Beamforming chip both on transmit and on receive.

Figure 15A:
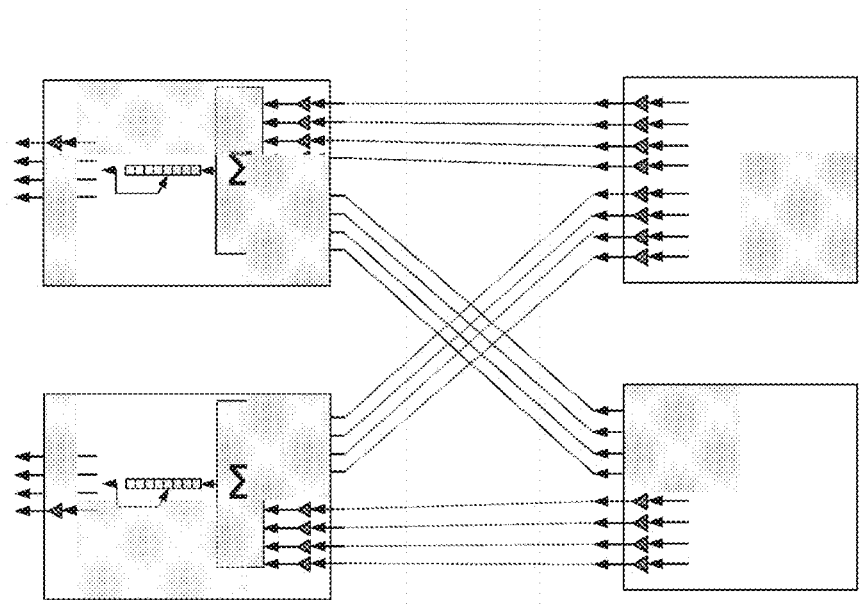
Figure 15B:
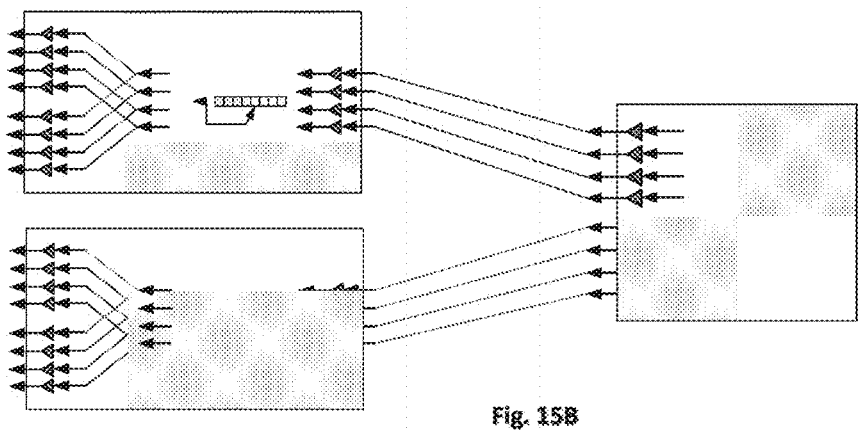
Figure 16:
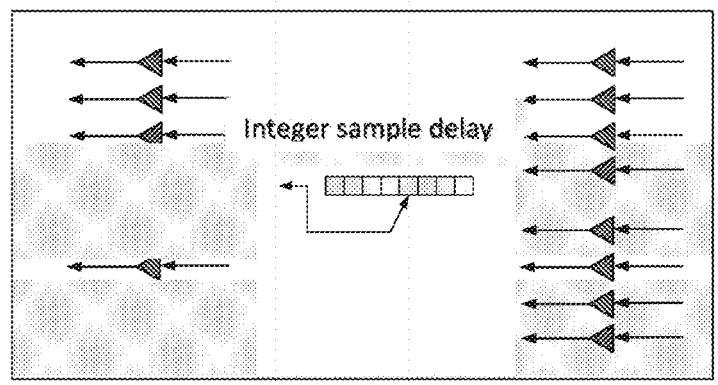

In order to enhance flexibility in ASIC to ASIC connections, the ASIC can be configured also as a building block for carrying out one or more of the following functions:

1. Summation of 2 bus inputs in the receive path+additional delay
2. Distribution of a bus to 2 busses in the transmit path+additional delay
3. Additional delay on the bus FIGS. 14A and 14B illustrate the ASIC as such a building block. FIG. 14A shows it as a bus summation block, while FIG. 14B shows it as a bus distribution block. The possible summation and distribution configurations are described in self-explanatory manner in FIG. 15A and FIG. 15B respectively. The building block as an additional delay unit is shown in FIG. 16.

Turning one to FIGS. 1A and/or 4A, it should be noted that beamforming logic control unit 50, which is preferably an inherent part of the ASIC chip 100 of the beamforming chip/system 100, of the present invention and/or of the global control unit 1010 of the antenna system 1000 which includes the plurality of such BF chips 1000 may be configured and operable for carrying out various beamforming functions. The Computation and Control unit 50 and/or 1010 may implemented one or more of the following functionalities are implemented:

Coefficient computations for the in-chip beamformers, based on the required beam direction, frequency and the ASIC position within the array, as well as tapering type.
Computation of necessary adjustment parameters including, for example, beam coefficients, internal gain and phase adjustments, filter parameters etc.
Direction of Arrival (DOA) estimation
Signal tracking
Parameter Storage, including
  Beam hopping timing and pattern
  Predefined directions
  Set of beamformers' parameters for at least one beam
  Known trajectories (including direction and timing)

A possible implementation of the direction-of-arrival estimation is performed as follows: the DOA direction search region is divided into several beams (preferably, all of which have the same bandwidth). For a case of a known signal, a correlation is performed on each of those beams and DOA detection is declared when the correlation output at one of those beams exceeds a pre-defined threshold. For a case of an unknown signal, the correlator is bypassed and the DOA detection is declared when the signal output at one of those beams exceeds a pre-defined threshold. However, other implementations are also feasible.

A possible implementation of the signal tracking is by measuring the amplitude difference or the phase difference of beams adjacent to the estimated direction of arrival, and using the measured difference to provide an error signal which is proportional to the deviation of the true direction from the estimated direction. This error signal is fed to a filter, that can be configured, if the motion dynamics is known, as a Kalman filter. The filter output can be used to correct the estimated direction and to predict the direction at which the beam should be configured as a function of time.

The invention claimed is:

1. A digital beam forming chip, comprising:
a plurality of digital baseband beam forming channels configured and operable for connecting via channel ports to a plurality of antenna channels associated with respective antenna elements for at least one of transmitting and receiving through the plurality of antenna elements one or more waveform signals encoding data streams; and
wherein said digital baseband beam forming channels are configured and operable to apply at least time delays of selective magnitudes to baseband signals associated with the data streams encoding the waveform signals, which are transmitted and/or received by the plurality of antenna elements, thereby beamforming said waveform signals to produce, by said waveforms, one or more data encoded beams associated with respective directions of propagation and encoded with said data streams respectively;
wherein at least one digital baseband beam forming channel of said one or more digital baseband beam forming channels comprises a time delay configured and operable for processing at least one baseband signal of said baseband signals at a certain sampling rate, and is capable of introducing selected time delays having time resolution higher than said certain sampling rate to said at least one baseband signal; said time delay comprises an adjustable time delay re-sampler configured and operable for delaying said baseband signal by a component of said time delay that includes a fraction of the time delay which is smaller than a sampling time period being one over the certain sampling rate of the digital baseband beam forming channel;
thereby enabling to apply said beamforming with time delay resolution exceeding said certain sampling rate.

2. The digital beam forming chip of claim 1, wherein said digital baseband beam forming channels are configured and operable to apply selective true time delays to the baseband signals that are communicated therethrough to thereby beamform said waveform signals.

3. The digital beam forming chip of claim 1, wherein said adjustable time delay re-sampler of the time delay is configured and operable to:
receive a digitized signal representing a stream of symbols
obtain control instructions indicative of a time delay fraction by which to delay said digitized signal whereby said time delay fraction includes a component of time smaller than said sampling time period;
resample said digitized signal via interpolation to obtain a time shifted resampled signal having a similar number of symbols as the digitized signal; and output said resampled signal thereby introducing of time delay with said time resolution higher than the certain sampling rate.

4. The digital beam forming chip of claim 1, wherein said time delay further comprises a shift register operable for delaying said baseband signal by an integer part of said time delay that measures to an integer multiplication of a sampling time period of the digital baseband beam forming channel.

5. The digital beam forming chip of claim 2, wherein said time delay comprises a complex gain circuit adapted for multiplying said at least one baseband signal by a complex gain selected to adjust said time delay to compensate for effects associated in up/down conversion between said baseband signal and a passband signal.

6. The digital beam forming chip of claim 1, comprising digital compensation channels whereby each digital compensation channel is connectable in between at least one of the digital baseband beam forming channels and at least one of the channel ports of the chip, and is configured and operable to apply digital compensation to signals communicated via said at least one channel port for compensating over analogue artifacts associated with antenna channel(s) of an analogue RF frontend module connecting said at least one channel port to one or more of the antenna elements.

7. The digital beam forming chip of claim 6, wherein at least one of the following:
 each digital compensation channel is respectively selectively connectable in between selected one or more of the digital baseband beam forming channels and at least one channel port of the chip; and wherein chip comprises an antenna channel combiner/distributer configured and operable receiving beamforming configuration instructions indicative of said selected one or more of the digital baseband beam forming channels, and selectively connecting said selected one or more of the digital baseband beam forming channels to said at least one channel port via said digital compensation processing channel;
 each digital compensation processing channel comprises a respective equalizer adapted for adjusting respective phases and gains of different frequency components of the baseband signal communicated in between the at least one digital baseband beam forming channel(s) and the at least one channel port associated the digital compensation processing channel; said adjusting is performed in accordance with respective frequency response of the antenna channel coupled to the channel port;
 at least some of said digital compensation processing channels are operable in a transmission mode and comprise respective non-linear pre-distortion modules, each being adapted to adjust at least one of amplitudes and phases of respective symbols communicated therethrough, so as to compensate for a non-linear distortion applied to the symbols by an amplifier of the antenna channel coupled to the respective channel port;
 said digital baseband beam forming channels are configured and operable for processing in-phase and quadrature (I/Q) representation of said baseband signals, and wherein each digital compensation processing channel comprises an I/Q corrector configured and operable for compensating over at least one of gain and skew errors in said I/Q representation of the baseband signals.

8. The digital beam forming chip of claim 1, configured such that signals, which are communicated between the digital baseband beam forming channels and associated channel ports, are in a form of in-phase and quadrature (I/Q) representation of said baseband signals.

9. The digital beam forming chip of claim 1, configured such said channel ports are operable for communicating therethrough signals of intermediate (IF) or passband (PBF) frequency; and wherein each digital baseband beam forming channel includes a frequency converter for converting between a baseband frequency of the baseband signal and said intermediate or passband frequency.

10. The digital beam forming chip of claim 1, comprising a plurality of antenna ports for connecting said digital baseband beamforming channels to a plurality of antenna channels associated with respective antenna elements; and wherein at least one of the following:
 said plurality of antenna ports are adapted for communicating with said antenna channels at least one of the following signal representations: in-phase and quadrature (I/Q) signals; intermediate frequency signals; and passband signals IF signals; and
 said antenna ports are analogue ports and wherein said digital beam forming chip comprises a plurality of signal converters associated with said antenna ports respectively and adapted for converting between analogue signals at said antenna ports and digital signals at said digital baseband beamforming channels.

11. The digital beam forming chip of claim 1, being configured and operable for selectively producing, by said waveforms, a selected number of said one or more data encoded beams of at least one of selectable bandwidths and data-rates and selectable beam-widths; and
 wherein, the digital beam forming chip comprises:
  a plurality of antenna ports;
  a pool of said plurality of digital baseband beamforming channels; and
  an antenna channel combining/distributing circuitry configured and operable for selectively connecting baseband beamforming channels of said pool to said plurality of antenna ports according to control parameters indicative of said selected number of beams, and desired bandwidth and beam width of each beam.

12. The digital beam forming chip of claim 11, comprising a control input port configured and operable for receiving control parameters indicative of one or more of the following parameters of said beams:
 said selected number of beams;
 selected antenna ports to be commonly or exclusively allocated to each of said selected number of beams;
 said sampling rate allocated for each of the said selected number of beams;
 directional control parameters indicative of selected directions of said beams and wherein said digital baseband beamforming channels of said pool are connectable to said control input port for receiving said directional control parameters and are configured and operable for introducing to the baseband signals time delays corresponding to said directional control parameters.

13. The digital beam forming chip of claim 11, comprising a control input port configured and operable for receiving a signal calibration parameters indicative of at least one of the following signal corrections for implementing accurate beamforming by the baseband signals:
 (i) a non-linear pre-distortion correction associated with non-linear pre-distortion of an antenna channel connected to said operative one of said digital baseband beamforming channels; and (ii) frequency equalizing calibration associated with frequency response of an antenna channel connected to said operative one of said digital baseband beamforming channels;
(iii) I/Q correction factors; and
(iv) at least one or more of Gain, phase and time delay correction required for said beamforming;
and wherein said chip comprises a digital compensation processing channel configured and operable for processing baseband signals associated with signals communicated via said channel ports for introducing signal corrections to the baseband signals processed thereby in accordance with said signal calibration parameters.

14. The digital beam forming chip of claim 1, being configured and operable for selectively encoding one or more data streams in a selected number of said one or more data encoded beams respectively; and
wherein, the beam forming chip comprises:
a pool of said plurality of digital baseband beamforming channels;
a data bus port for providing said one or more data streams associated with said selected numbers of the beams respectively; and
a data combining/distributing circuitry connectable to said data bus and said beamforming channels and configured and operable to selectively communicating each data-stream of said one or more data stream in between the data bus and the respective digital baseband beamforming channels associated with production of the respective beam encoding said data-stream.

15. The beamforming chip claim 1, configured and operable to carry out at least one of the following:
allocate a variable number of said digital baseband beamforming channels to transmit and receive one or more of said beams;
allocate a variable number of digital baseband beamforming channels to different beams;
associate a variable number of digital baseband beamforming channels with selected antenna ports to thereby enable operating an antenna array connected to said antenna ports in an independent sub-arrays mode;
selectively associate a variable number of digital baseband beamforming channels with antenna ports associated with various polarizations to thereby enable control over vertical polarization, horizontal polarization, or any slant angle polarization of said beams.

16. The beamforming chip of claim 1, configured and operable for communicating, in said antenna ports, signals of intermediate frequency ranging from zero (baseband signaling) to half of said certain sampling rate.

17. The beamforming chip of claim 1, comprising beamforming logic processor comprising a central processing unit (CPU) and a storage section; and
wherein a beamforming logic processor connectable to a control input port of the chip and configured and operable for carrying out one or more of the following:
processing beamforming control instructions provided via said control input port and being indicative of one or more beams to be produced by the beamforming chip; and operating the beam forming channels of the chip to introduce corresponding delays to the baseband signals processed thereby for forming said beams;
processing configuration instructions provided via said control input port and being indicative of predetermined allocation of said beam forming channels to said channel ports enabling production of predetermined number of beams of predetermined bandwidths or beam-widths, and of allocations of said data-streams to said predetermined number of beams; and operating antenna channel combiner/distributer of said chip to allocate said beam forming channels to said channel ports, and operating a data channel combiner/distributer of said chip to direct said data-streams, which are allocated to said beams, to/from respective beam forming channels associated with the production of said beams respectively;
processing analogue channel calibration parameters associated with artifacts of analogue channels of an RF frontend module, which is connectable to said chip via said channel ports, to determine correction parameters, and operating a plurality of digital compensation processing channels of said chip based on said correction parameters for digitally compensating for said artifacts of the analogue channels of the RF frontend module.

18. The beamforming chip of claim 1, configured and operable as a digital baseband beamforming chip for use in an array including a plurality of similar digital baseband beamforming chips, each connectable to a respective group of antenna elements of an antenna array via an RF front end module that is adapted for at least one of transmitting and receiving waveform signals by the respective group of antenna elements; and wherein the digital baseband beamforming chip is adapted to be connected in a chain to one or more digital baseband beamforming chips of the plurality of similar digital baseband beamforming chips via a common bus through which data streams encoded in said waveform signals are communicated to/from the digital baseband beamforming chip.

19. The beamforming chip of claim 18, wherein at least one of the following:
said array of the plurality of similar digital baseband beamforming chips is an array of chipsets each comprising one of the digital baseband beamforming chips and one or more analogue RF frontend chips connectable in between the digital baseband beamforming chip and its respective group of antenna elements;
the digital baseband beamforming chip comprises a global time delay configured and operable for introducing time delays to the plurality of data streams communicated in between the digital baseband beamforming chip and the bus so as to enable to timely synchronize the respective operations of the plurality of similar digital baseband beamforming chips thereby facilitating implementation of collective beamforming of waveforms that are collectively transmitted/received by the plurality of groups of antenna elements that are respectively connected to the plurality of similar digital baseband beamforming chips.

20. A scalable array comprising a plurality of similar digital baseband beamforming chips according to claim 1, each connectable to a respective group of antenna elements of an antenna array via an RF frontend module, for beamforming waveform signals being transmitted or received by the respective group of antenna elements.

* * * * *